(12) United States Patent
Li et al.

(10) Patent No.: US 12,219,543 B2
(45) Date of Patent: Feb. 4, 2025

(54) BEAM TRAINING METHOD AND APPARATUS

(71) Applicant: HUAWEI TECHNOLOGIES CO., LTD., Guangdong (CN)

(72) Inventors: Yanchun Li, Boulogne Billancourt (FR); Mingjie Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 795 days.

(21) Appl. No.: 17/204,071

(22) Filed: Mar. 17, 2021

(65) Prior Publication Data

US 2021/0204270 A1 Jul. 1, 2021

Related U.S. Application Data

(63) Continuation of application No. PCT/CN2019/104951, filed on Sep. 9, 2019.

(30) Foreign Application Priority Data

Sep. 17, 2018 (CN) .......................... 201811083957.1

(51) Int. Cl.
*H04W 72/044* (2023.01)
*H04W 16/28* (2009.01)
*H04W 72/23* (2023.01)

(52) U.S. Cl.
CPC ......... *H04W 72/046* (2013.01); *H04W 16/28* (2013.01); *H04W 72/23* (2023.01)

(58) Field of Classification Search
CPC .... H04W 72/046; H04W 72/23; H04W 16/28
See application file for complete search history.

(56) References Cited

U.S. PATENT DOCUMENTS

2006/0056532 A1\* 3/2006 Li .................... H04L 25/03343
375/267
2015/0009951 A1 1/2015 Josiam et al.
(Continued)

FOREIGN PATENT DOCUMENTS

CN 104253673 A 12/2014
CN 104734754 A 6/2015
(Continued)

OTHER PUBLICATIONS

Samsung et al., "UL Beam Management," 3GPP TSG RAN WG1 NR Ad-Hoc#2, R1-1710653, Qingdao, China, Jun. 27-30, 2017, 5 pages.

(Continued)

*Primary Examiner* — Jasper Kwoh
(74) *Attorney, Agent, or Firm* — Fish & Richardson P.C.

(57) ABSTRACT

This disclosure provides methods and apparatuses related to beam training for performing beamforming in wireless communications. In an implementation, an access point (AP) sends training configuration information to a plurality of stations, wherein the training configuration information comprises a first antenna configuration indicating a plurality of first uplink beams corresponding to the plurality of stations. The AP receives a plurality of training frame sent by each of the plurality of stations by using a corresponding second uplink beam and determines, based on the plurality of training frames sent by the plurality of stations, a plurality of third uplink beams for the plurality of stations to send uplink data.

28 Claims, 15 Drawing Sheets

(56) References Cited

U.S. PATENT DOCUMENTS

| | | | | |
|---|---|---|---|---|
| 2016/0205701 | A1* | 7/2016 | Chen | H04B 7/0626 370/329 |
| 2017/0279507 | A1* | 9/2017 | Kim | H04B 7/0874 |
| 2017/0317727 | A1* | 11/2017 | Wang | H04B 7/0452 |
| 2018/0227786 | A1 | 8/2018 | Yu et al. | |
| 2019/0109625 | A1* | 4/2019 | Subramanian | H04B 7/063 |

FOREIGN PATENT DOCUMENTS

| | | |
|---|---|---|
| CN | 105103261 A | 11/2015 |
| CN | 107172625 A | 9/2017 |
| CN | 107733479 A | 2/2018 |
| CN | 107733505 A | 2/2018 |
| CN | 107733605 A | 2/2018 |
| WO | 2015089894 A1 | 6/2015 |
| WO | 2017156114 A1 | 9/2017 |
| WO | 2018078126 A1 | 5/2018 |
| WO | 2018144844 A1 | 8/2018 |

OTHER PUBLICATIONS

Samsung et al., "UL Beam Management," 3GPP TSG RAN WG1#89, R1-1707952, Hangzhou, China, May 15-19, 2017, 6 pages.

Office Action in Chinese Appln. No. 201811083957.1, dated Sep. 23, 2022, 8 pages (with English translation).

Huawei et al., "DCI contents and formats in NR," 3GPP TSG RAN WG1 Meeting #91, R1-1719389, Reno, USA, 27 Nov. 1, Dec. 2017, 11 pages.

Huawei et al., "Discussion on panel-based UL beam selection," 3GPP TSG RAN WG1 Meeting #94, R1-1809122, Gothenburg, Sweden, Aug. 20-24, 2018, 7 pages.

IEEE P802.11ax/D2.2, "Draft Standard for Information technology—Telecommunications and information exchange between systems Local and metropolitan area networks—Specific requirements—Part 11: Wireless LAN Medium Access Control(MAC) and Physical Layer (PHY) Specifications, Amendment 6: Enhancements for High Efficiency WLAN," Feb. 2018, 620 pages.

IEEE P802.11ay/D2.0, Draft Standard for Information Technology—10 Telecommunications and Information Exchange 11 Between Systems—Local and Metropolitan Area 12 Networks—Specific Requirements—Part 11: Wireless 13 LAN Medium Access Control (MAC) and Physical Layer 14 (PHY) Specifications-15, Amendment 7: Enhanced throughput for operation in 16 license-exempt bands above 45 GHZ, Jul. 2018, 673 pages.

IEEE Std 802.11ad-2012, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band," Oct. 2012, 628 pages.

PCT International Search Report and Written Opinion issued in International Application No. PCT/CN2019/104951 on Nov. 27, 2019, 17 pages (with English translation).

Zhou et al., "Enhanced Random Access and Beam Training for Millimeter Wave Wireless Local Networks With High User Density," IEEE Transactions on Wireless Communications, vol. 16, No. 12, Dec. 2017, 14 pages.

Office Action issued in Chinese Application No. 201811083957.1 on Jan. 18, 2022, 12 pages.

* cited by examiner

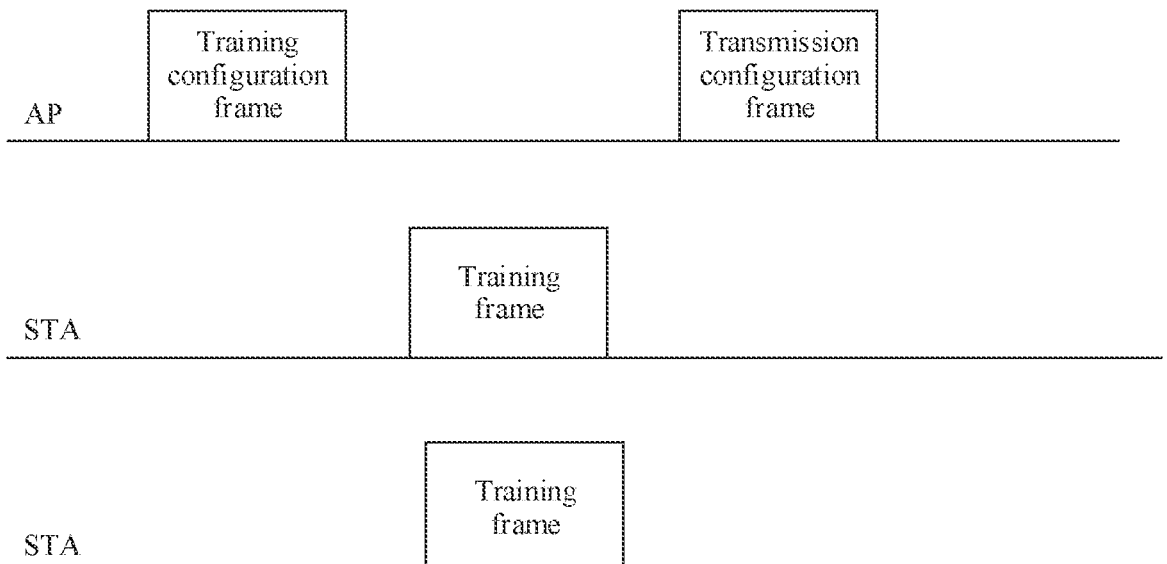
FIG. 5a
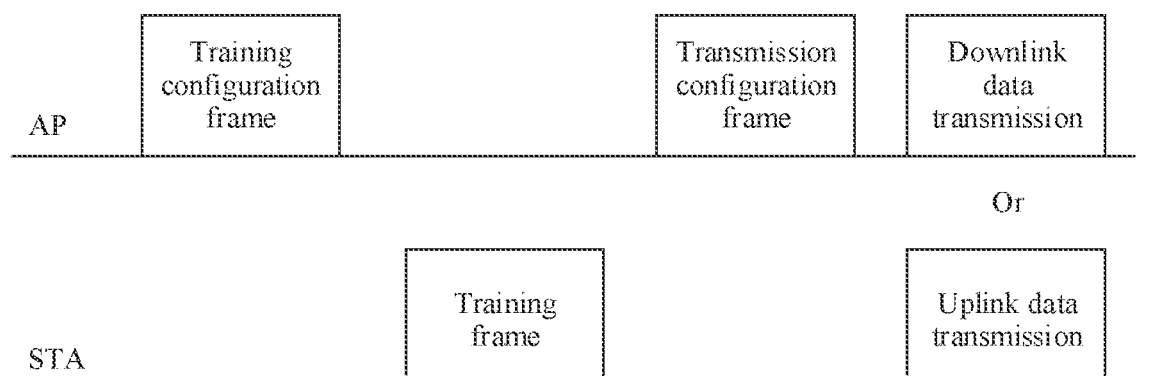
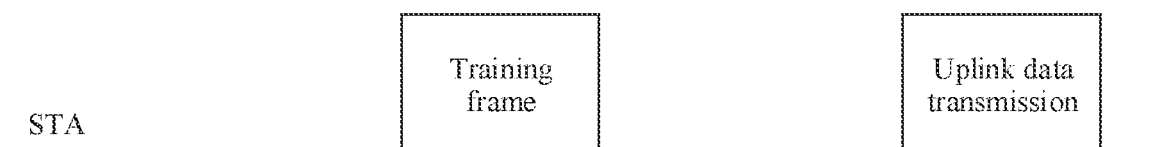
FIG. 5b

| MIMO selection control (MIMO Selection Control) | Configuration N (Config.N) | | | |
|---|---|---|---|---|
| | Configuration 1 (Config.1) | Receive antenna Ntx (RX Antenna Ntx) | | Receive antenna port ID (RX Ant ID) |
| | | | | Transmit sector/beam/AWV ID (TX Sector/Beam/AWV ID) |
| | | | ⋮ | Receive antenna port ID (RX Ant ID) |
| | | Receive antenna 1 (RX Antenna 1) | Associated user k transmit antenna port (Associated Userk TX Ant) | Receive antenna port ID (RX Ant ID) |
| | | | Associated user k transmit AWV (Associated Userk TX AWV) | Transmit sector/beam/AWV ID (TX Sector/Beam/AWV ID) |
| | | | Dialog token field (Dialog Token Field) | |
| | | | Associated user 1 transmit antenna port (Associated User1 TX Ant) | |
| | | | Associated user 1 transmit AWV (Associated User1 TX AWV) | Transmit antenna port ID (TX Ant ID) |
| | | | Dialog token field (Dialog Token Field) | Dialog token field (Dialog Token Field) |
| | | | User mask (User Mask) | User mask (User Mask) |
| | | Number of antenna ports (Num. of Ants) | | |
| | | Single-user/Multi-user (SU/MU) | | |
| MAC header field (MAC Header) | EDMG group identifier (EDMG Group ID) | | | |
| | Receiver address=Broadcast address (RA=broadcast) | | | |
| | Transmitter address=Basic service set identifier (TA=BSSID) | | | |

FIG. 10

BEAM TRAINING METHOD AND APPARATUS

CROSS-REFERENCE TO RELATED APPLICATIONS

This application is a continuation of International Application No. PCT/CN2019/104951, filed on Sep. 9, 2019, which claims priority to Chinese Patent Application No. 201811083957.1, filed on Sep. 17, 2018. The disclosures of the aforementioned applications are hereby incorporated by reference in their entireties.

TECHNICAL FIELD

This application relates to the field of communications technologies, and in particular, to a beam training method and apparatus.

BACKGROUND

Wireless communication in a high frequency band is one of the hot research technologies in 5G and Wi-Fi communications systems. IEEE 802.11ad and IEEE 802.11ay are standards for high-frequency wireless communications applications in the Wi-Fi communications system. Both 802.11ay and 802.11ad work at 60 GHz of a millimeter-wave band. An available bandwidth of the 60 GHz millimeter-wave band is very wide, and may provide a very high communication rate. However, a path loss of a millimeter-wave channel is large, and signal attenuation is severe. Therefore, a beamforming (beamforming, BF) technology needs to be used to provide an additional antenna gain, to overcome the signal attenuation. When the beamforming technology is used, beam training needs to be performed. How to improve beam training efficiency and shorten a beam training time are key issues in improving transmission efficiency in a high-frequency communications system.

SUMMARY

Tis application provides a beam training method and apparatus, to improve beam training efficiency.

According to a first aspect, a beam training method is provided, where the method includes: An access point AP sends training configuration information to a plurality of stations STAs, where the training configuration information includes first antenna configuration used to indicate a plurality of first uplink beams, one first uplink beam in the plurality of first uplink beams is used by one STA in the plurality of STAs to determine a second uplink beam for sending a training frame, and the first uplink beams include the second uplink beam. The AP receives the training frame sent by each STA in the plurality of STAs by using a corresponding second uplink beam. The AP determines, based on the training frames sent by the plurality of STAs, a plurality of third uplink beams used by the plurality of STAs to send uplink data.

It can be learned from the foregoing description that the AP may send the training configuration information to the STA, where the training configuration information may be used to indicate the plurality of first uplink beams. The STA may determine the second uplink beam based on the plurality of first uplink beams, and perform beam training on the second uplink beam. Compared with a case in which a STA performs beam training on all uplink beams, this application can improve beam training efficiency. In addition, the AP may select, based on beam scanning and measurement results, the first uplink beam with low inter-user interference for reference by the STA, to avoid blind training of all beam directions by the STA, thereby shortening a beam training time and improving training efficiency.

In a possible implementation, the method further includes: The AP sends transmission configuration information to the plurality of STAs, where the transmission configuration information includes third antenna configuration used to indicate the plurality of third uplink beams, one third uplink beam in the plurality of third uplink beams is an uplink beam used by a corresponding STA for uplink data transmission, and the plurality of second uplink beams include the plurality of third uplink beams.

It can be learned from the foregoing description that a transmission configuration frame may carry transmission configuration information of a plurality of STAs, and mutual interference between a plurality of third uplink beams indicated by the transmission configuration information of the plurality of STAs is relatively small. Therefore, when the plurality of STAs perform parallel uplink data transmission, that is, when the plurality of STAs perform UL MU-MIMO transmission, MU-MIMO interference is small. This can improve quality of communication between a plurality of MU-MIMO users, and improve transmission efficiency.

According to a second aspect, a beam training method is provided, where the method includes: A station STA receives training configuration information sent by an access point AP, where the training configuration information includes first antenna configuration used to indicate a plurality of first uplink beams, one first uplink beam in the plurality of first uplink beams is used by one STA in a plurality of STAs to determine a second uplink beam for sending a training frame, and the first uplink beams include the second uplink beam. The station sends the training frame by using the corresponding second uplink beam, where the training frame is used by the AP to determine a third uplink beam used by the STA to send uplink data.

In a possible implementation, the method further includes: The STA receives transmission configuration information sent by the AP, where the transmission configuration information includes third antenna configuration used to indicate a plurality of third uplink beams, one third uplink beam in the plurality of third uplink beams is an uplink beam used by a corresponding STA for uplink data transmission, and a plurality of second uplink beams include the plurality of third uplink beams.

In a possible implementation, the first antenna configuration includes one or more of a transmit antenna ID, a transmit sector ID, a count value, or an antenna weight vector AWV ID corresponding to the first uplink beam. The training configuration information further includes one or more of a downlink beam identifier, a receive antenna ID, a receive sector ID, or an AWV ID used by the AP to receive the training frame.

In a possible implementation, the third antenna configuration includes one or more of a transmit antenna ID, a transmit sector ID, a count value, or an AWV ID used by a corresponding STA to send uplink data. The transmission configuration information further includes one or more of a downlink beam identifier, a receive antenna ID, a receive sector ID, or an AWV ID used by the AP to receive the uplink data.

It can be learned from the foregoing description that the transmission configuration information of the plurality of STAs may further include an antenna configuration of sending uplink data by each STA and an antenna configuration of receiving uplink data by the AP, so that the AP can coordinate receive antennas of the STAs, thereby avoiding a receive antenna conflict when the STA selects a receive antenna. For example, for a STA 1 and a STA 2, the AP may allocate antennas 1 and 2 of the AP to receive a signal of the STA 1, and antennas 3 and 4 of the AP to receive a signal of the STA 2. However, if the STAs select receive antennas, the STA 1 may select the antennas 1 and 2 of the AP to receive the signal of the STA 1, and the STA 2 may select the antennas 2 and 3 of the AP to receive the signal of the STA 2. Because the antenna 2 of the AP cannot point to beams of the STA 1 and the STA 2 at the same time for receiving. In this case, transmission using the antenna 2 of the AP conflicts.

In a possible implementation, the transmission configuration information further includes a plurality of session identifiers, and the plurality of session identifiers include identifiers of sessions in which the plurality of training frames are located.

According to a third aspect, a beam training apparatus is provided. The apparatus may be an access point AP or may be a chip in an access point AP. The apparatus has a function of implementing the AP in the foregoing embodiments. The function may be implemented by hardware, or may be implemented by hardware executing corresponding software. The hardware or the software includes one or more units corresponding to the foregoing function.

In a possible design, when the apparatus is an access point AP, the access point AP may include a processing module and a transceiver module. The processing module may be, for example, a processor, the transceiver module may be, for example, a transceiver, and the transceiver may include a radio frequency circuit and a baseband circuit.

Optionally, the apparatus may further include a storage unit, and the storage unit may be, for example, a memory. When the access point AP includes the storage unit, the storage unit is configured to store a computer-executable instruction. The processing module is connected to the storage unit, and the processing module executes the computer-executable instruction stored in the storage unit, so that the apparatus performs the beam training method related to a function of the AP.

In another possible design, when the apparatus is a chip in an access point AP, the chip includes a processing module and a transceiver module. The processing module may be, for example, a processor, and the transceiver module may be, for example, an input/output interface, a pin, or a circuit on the chip. Optionally, the apparatus may further include a storage unit, and the processing module may execute a computer-executable instruction stored in the storage unit, so that the chip in the AP performs the beam training method related to a function of the access point AP in any one of the foregoing aspects.

Optionally, the storage unit is a storage unit in the chip, such as a register or a cache. Alternatively, the storage unit may be a storage unit that is in the access point AP (a parent node) but outside the chip, such as a read-only memory (read-only memory, ROM for short) or another type of static storage device that can store static information and a static instruction, or a random access memory (random access memory, RAM for short).

According to a fourth aspect, this application provides a beam training apparatus. The apparatus may be a station STA, or may be a chip in a STA. The apparatus has a function of implementing various embodiments related to the STA in the foregoing aspects. The function may be implemented by hardware, or may be implemented by hardware executing corresponding software. The hardware or the software includes one or more units corresponding to the foregoing function.

In a possible design, when the apparatus is a STA, the STA includes a processing module and a transceiver module. The processing module may be, for example, a processor, the transceiver module may be, for example, a transceiver, and the transceiver includes a radio frequency circuit. Optionally, the STA further includes a storage unit, and the storage unit may be, for example, a memory. When the STA includes the storage unit, the storage unit is configured to store a computer-executable instruction. The processing module is connected to the storage unit, and the processing module executes the computer-executable instruction stored in the storage unit, so that the STA performs the beam training method related to a function of the STA in any one of the foregoing aspects.

In another possible design, when the apparatus is a chip in a STA, the chip includes a processing module and a transceiver module. The processing module may be, for example, a processor, and the transceiver module may be, for example, an input/output interface, a pin, or a circuit on the chip. The processing module may execute a computer-executable instruction stored in a storage unit, so that the chip in the STA performs the beam training method in the foregoing aspects. Optionally, the storage unit is a storage unit in the chip, for example, a register or a cache. Alternatively, the storage unit may be a storage unit that is in the STA but outside the chip, such as a ROM, another type of static storage device that can store static information and a static instruction, or a RAM.

The processor mentioned anywhere above may be a CPU, a microprocessor, an ASIC, or one or more integrated circuits configured to control program execution of the beam training method.

According to a fifth aspect, a computer storage medium is provided. The computer storage medium stores program code. The program code is used to indicate an instruction for performing the method according to any one of the first aspect, the second aspect, or the possible implementations of the first aspect or the second aspect.

According to a sixth aspect, a processor is provided. The processor is configured to be coupled to a memory, and configured to invoke, from the memory, and run an instruction stored in the memory, so that a communications device in which the processor is installed performs the method according to any one of the first aspect, the second aspect, or the possible implementations of the first aspect or the second aspect.

According to a seventh aspect, a computer program product including an instruction is provided. When the computer program product runs on a computer, the computer is enabled to perform the method according to any one of the first aspect, the second aspect, or the possible implementations of the first aspect or the second aspect.

According to an eighth aspect, a communications system is provided. The system includes the access point AP and at least one STA according to any one of the first aspect to the fourth aspect.

BRIEF DESCRIPTION OF DRAWINGS

FIG. 5a, FIG. 5b, and FIG. 5c are schematic diagrams of a transmission configuration frame according to an embodiment of this application;

FIG. 10 is a schematic diagram of a configuration frame carrying a session identifier according to an embodiment of this application:

DESCRIPTION OF EMBODIMENTS

Figure 1:
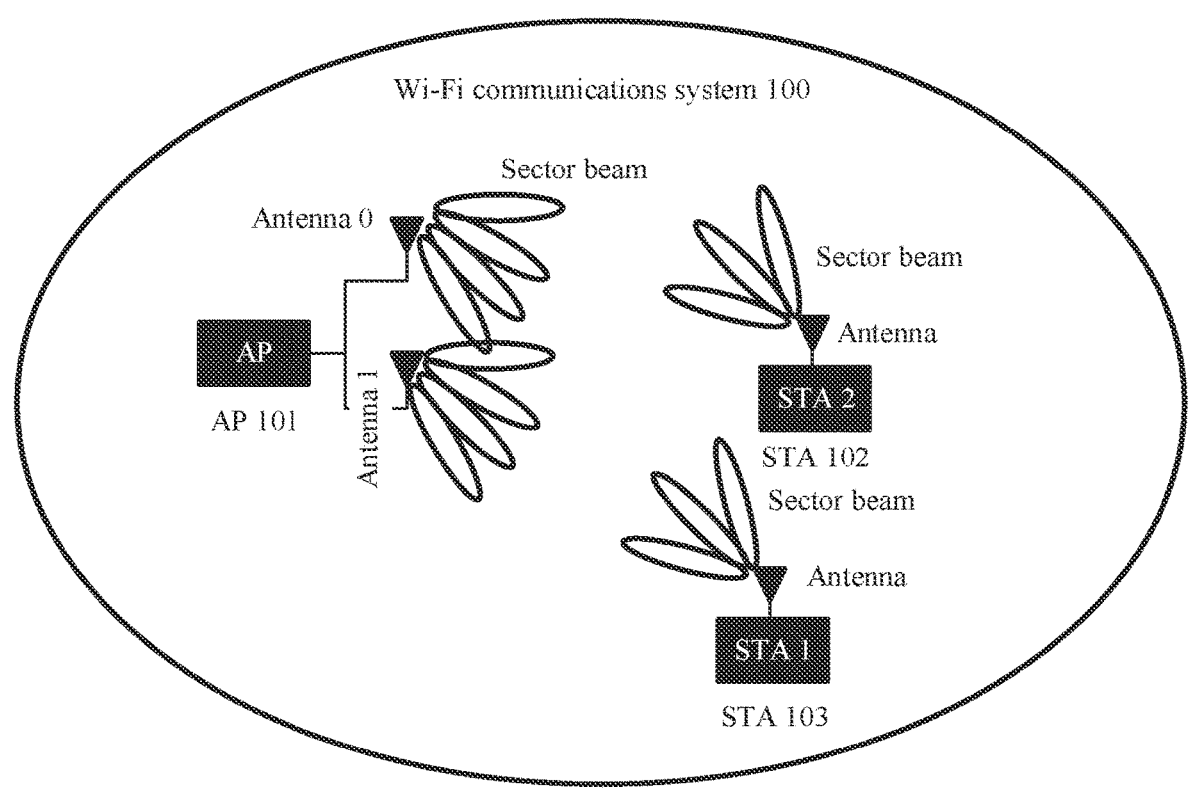
FIG. 1 is a schematic diagram of a communications system according to an embodiment of this application.

The following describes technical solutions of this application with reference to the accompanying drawings.

The technical solutions of the embodiments of this application may be applied to various communications systems, such as a wireless local area network (wireless LAN, WLAN) communications system, a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system. UMTS), a worldwide interoperability for microwave access (worldwide interoperability for microwave access, WiMAX) communications system and a 5th generation (5th generation, 5G) system or a new radio (new radio, NR) system.

A station (station, STA) in the embodiments of this application is a communications apparatus that has a wireless transceiver function, and may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. For example, the STA may be a station in a WLAN. The STA may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a 5G network, or a terminal device in a future evolved public land mobile network (public land mobile network, PLMN). The embodiments of this application are described by using the STA as an example, but this application is not limited thereto.

An access point (access point, AP) in the embodiments of this application is a communications apparatus that has a wireless transceiver function, may provide a service for a station, and may be a device configured to communicate with the STA. For example, the AP may be a base transceiver station (base transceiver station, BTS) in a global system for mobile communications (global system for mobile communications, GSM) system or in a code division multiple access (code division multiple access, CDMA) system, a NodeB (nodeB, NB) in a wideband code division multiple access (wideband code division multiple access, WCDMA) system, an evolved NodeB (evolved Node B, eNB or eNodeB) in an LTE system, or a radio controller in a cloud radio access network (cloud radio access network, CRAN) scenario. Alternatively, the network device may be a relay station, a vehicle-mounted device, a wearable device, a network device in a 5G network, a network device in a future evolved PLMN network, or an access point in a WLAN. The embodiments of this application are described by using the AP as an example, but the embodiments of this application are not limited thereto.

The WLAN is used as an example. As shown in FIG. 1, an embodiment of this application provides a wireless fidelity (wireless-fidelity, WI-FI) communications system 100. The WI-FI communications system 100 may include an access point (access point, AP) 101, a station (station, STA) 102, and a STA 103. A quantity of APs and a quantity of STAs are not limited in the WI-FI communications system 100. In this embodiment of this application, an example in which the WI-FI communications system 100 includes one AP and two STAs is used for description.

In this embodiment of this application, the AP 101 may communicate with the STA 102 and the STA 103 by using a beamforming (beamforming. BF) technology, and at least one STA of the STA 102 and the STA 103 has an analog beamforming capability.

In this embodiment of this application, when the AP 101 performs parallel communication with the STA 102 and the STA 103 on a same target spectrum by using a plurality of antenna weight vectors (antenna weight vector, AWV) or beams, this may be referred to as multi-user multiple-input multiple-output (multi-user multiple-input multiple-output, MU-MIMO). The STA 102 and the STA 103 send data to the AP 101 in parallel in space domain. This may be referred to as uplink multi-user multiple-input multiple-output (uplink multi-user multiple-input multiple-output, UL MU-MIMO). The AP 101 sends data to the STA 102 and the STA 103 in parallel in space domain. This may be referred to as downlink multi-user multiple-input multiple-output (downlink multi-user multiple-input multiple-output, DL MU-MIMO).

It should be noted that, in this embodiment of this application, the AP 101 in the WI-FI communications system 100 may be a virtual AP, or may be a physical AP. The virtual AP may include a plurality of physical APs. and antennas of the plurality of physical APs may jointly form MIMO to provide a service for the STA.

Figure 2:
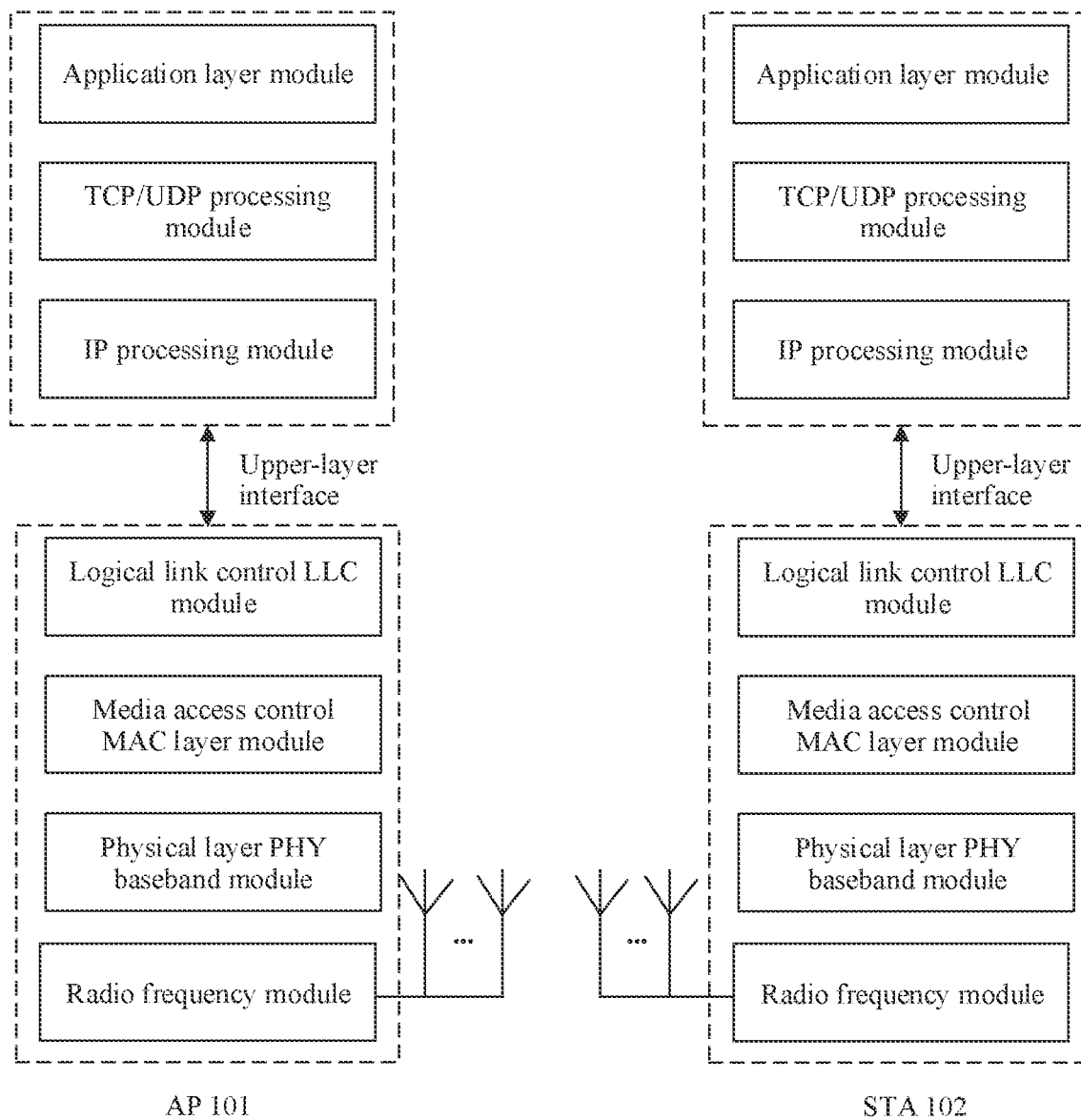
FIG. 2 is a schematic diagram of an internal structure of an AP or a STA according to an embodiment of this application.

In this embodiment of this application, as shown in FIG. 2, the AP 101, the STA 102, or the STA 103 may include one or more of an application (application) layer module, a transmission control protocol/user datagram protocol (transmission control protocol/user datagram protocol, TCP/UDP) processing module, an IP processing module, a logical link control (logical link control, LLC) module, a media access control (media access control, MAC) layer module, a physical layer (physical layer, PHY) baseband module, a radio frequency (radio) module, or an antenna.

In an example of this application, a beam training method provided in the embodiments of this application may be implemented by using a MAC layer module and a lower-layer module of the MAC layer module. To be specific, the AP 101 or the STA 102 may include a MAC layer module, a PHY layer baseband module, a radio frequency module, and the like, and an upper-layer module of the AP 101 or the STA 102 is not limited in this example. For example, in a specific application such as a dedicated video stream transmission system, the AP 101 or the STA 102 may not include a TCP/UDP processing module or an IP processing module, and an application layer module directly encapsulates and transmits a multimedia bitstream, or transmits a multimedia bitstream by using a non-encapsulated data stream.

In another example of this application, a beam training method provided in the embodiments of this application may be implemented by using a logical link control LLC module and a media access control MAC layer module. Antenna control and adjustment and beamforming are implemented by a physical layer PHY baseband module, a radio frequency module, and an antenna.

In this embodiment of this application, as shown in FIG. 2, the antenna may be connected to the radio frequency module. The antenna and the radio frequency module may be fixedly connected in a one-to-one manner, or may be connected in a switchable (switchable) manner. The radio frequency module is configured to convert a baseband signal generated by the physical layer baseband module into a signal of a target spectrum, or convert a signal of a target spectrum into a baseband signal and transmit the baseband signal to the physical layer baseband module. The target spectrum may be a millimeter-wave band, another band, or the like. The antenna is configured to transmit and propagate, or receive and capture the signal of the target spectrum in a specific antenna or beam direction.

The radio frequency module may be connected to the physical layer PHY baseband module. The physical layer PHY baseband module is mainly configured to process a signal, for example, perform digital-to-analog conversion and analog-to-digital conversion on the signal, and process a received signal and a transmitted signal. Optionally, the physical layer PHY baseband module may further modulate a signal to a target frequency band or demodulate a received signal.

The physical layer PHY baseband module is connected to the logical link control LLC module and the media access control MAC module in upper-layer protocol modules, to perform packet encapsulation and decapsulation (the "packet" has a packet header in a prescribed format) or perform block division or aggregation on data (the "block" does not include a packet header), and execute a packet sending and receiving sequence stipulated in a protocol, including sending a training frame, receiving a training frame, returning a response frame, and the like.

The physical layer baseband module may generate a reference signal for measurement, receive a reference signal, and estimate a signal strength, channel quality, or a channel coefficient.

It should be noted that the example shown in FIG. 2 shows merely layering of the AP 101, the STA 102, and the STA 103, and is not intended to limit this application. For example, in the embodiments of this application, the logical link control LLC layer module and the media access control MAC layer module may alternatively be integrated into a generalized MAC layer module for implementation. Examples are not given one by one herein for description.

Figure 3:
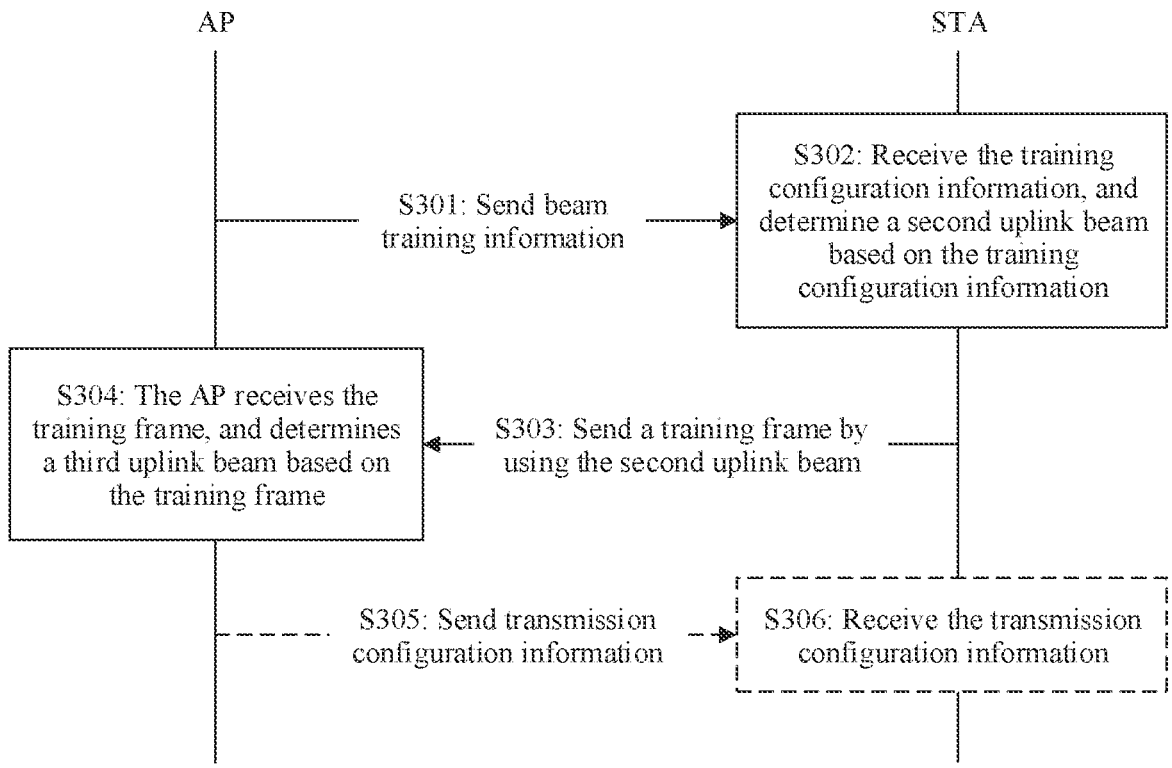
FIG. 3 is a flowchart of a beam training method according to an embodiment of this application.

Based on the application scenario provided in FIG. 1, as shown in FIG. 3, an embodiment of this application provides a procedure of a beam training method. In the procedure, an AP may be specifically the AP 101 shown in FIG. 1, and a STA may be specifically the STA 102 or the STA 103 shown in FIG. 1.

It may be understood that, in this embodiment of this application, a function of the AP may also be implemented by another device or module, for example, may be implemented by a chip used in the AP; a function of the STA may also be implemented by another device or module, for example, may be implemented by a chip used in the STA.

As shown in FIG. 3, the procedure may be specifically as follows:

Step S301: The AP sends training configuration information.

The training configuration information includes first antenna configuration of a plurality of first uplink beams, one of the plurality of first uplink beams is used by one STA in a plurality of STAs to determine a second uplink beam for sending a training frame, and the first uplink beams include the second uplink beam. In an example of this embodiment of this application, the first antenna configuration of the first uplink beam includes one or more of a transmit antenna ID, a transmit sector ID, a count value, or an antenna weight vector (antenna weight vector, AWV) ID corresponding to the first uplink beam. In this embodiment of this application, the count value may be referred to as a sequence number. The count values may be count values of a series of reference signals or reference frames (reference is also referred to as scanning or training) that are sent in respective beam sending manners, and counting may be performed in ascending order or in descending order. A count value number of the first signal or frame may be 0 or 1, or a count value number of the last signal or frame may be 0 or 1. When the counting is performed in descending order, the count value may be referred to as a countdown (countdown down, CDOWN) value. An AWV may be a vector including a group of signal weighting coefficients acting on a multi-antenna array element. Optionally, the training configuration information may further include one or more of a downlink beam identifier, a receive antenna ID, a receive sector ID, or an AWV ID used by the AP to receive a training frame.

In this embodiment of this application, a quantity of the plurality of first uplink beams may be the same as a quantity of the plurality of STAs that send training frames. For example, the AP may indicate five first uplink beams to five STAs respectively, where the five first uplink beams are in a one-to-one correspondence with the five STAs. In other words, one first uplink beam is indicated to one STA. In another example, in this embodiment of this application, a quantity of the plurality of first uplink beams may be greater than a quantity of the plurality of STAs that send training frames. For example, the AP may indicate 10 first uplink beams to five STAs, where two first uplink beams are indicated to each STA. In still another example, quantities of first uplink beams indicated by the AP to different STAs may be the same or different. For example, the AP may alternatively indicate 20 first uplink beams to five STAs, where two first uplink beams are indicated to each of some STAs, three first uplink beams are indicated to each of some STAs, and one first uplink beam is indicated to each of remaining STAs.

In this embodiment of this application, the plurality of first uplink beams indicated by the AP in the training configuration information may be randomly selected by the AP may be selected by the AP according to a preset rule, or may be selected by the AP based on a training result obtained through previous beam training.

In an example of this application, the AP may obtain, based on preliminary wide beam scanning and measurement results, a set of beams whose signal strengths are greater than a first threshold, to form a beam set 0. The AP selects, from the beam set 0, a set of beams whose uplink interference is less than or equal to a second threshold, to form a beam set 1. For example, a beam in the beam set 1 may meet the following formula: $I\_(i, j) < I\_threshold$, where $\_(i, j)$ represents a predicted value of an interference strength of an uplink signal of a user j to a received signal of a user i, and I_threshold1 represents the first threshold. The AP selects, from the beam set 0, a set of beams whose uplink interference is greater than the second threshold and less than a third threshold, to form a beam set 2. For example, a beam in the beam set 2 may meet the following formula: $I\_threshold < I\_(i, k) \leq threshold2$, where $I\_(i, k)$ represents a predicted value of an interference strength of an uplink signal of a user k to the received signal of the user i, I_threshold1 represents the first threshold, and I_threshold2 represents the second threshold.

The AP may select the first uplink beams from the beam set 1. When beams in the beam set 1 do not meet a preset condition, for example, there is no beam in the beam set 1, a gain of the beams in the beam set 1 is insufficient, or there are insufficient beams in the beam set 1, the following solutions may be used: In a first solution, refined beam training is further performed on the beams in the beam set 1, to obtain first uplink beams that meet the condition. In a second solution, beams in the beam set 2 are searched in a refined way for more narrow beams, to obtain first uplink beams that meet the condition.

In another example of this application, the AP may directly select, from uplink beams, an uplink beam that meets a specific condition as the first uplink beam. For example, the AP may select an uplink beam whose interference is less than a specific threshold.

In this embodiment of this application, the AP may send the training configuration information to the STA, where the training configuration information may be used to indicate the plurality of first uplink beams. The STA may determine the second uplink beam based on the plurality of first uplink beams, and perform beam training on the second uplink beam. Compared with a case in which a STA performs beam training on all uplink beams, this application can improve beam training efficiency. In addition, the AP may select, based on beam scanning and measurement results, the first uplink beam with low inter-user interference for reference by the STA, to avoid blind training of all beam directions by the STA, thereby shortening a beam training time and improving training efficiency.

Step S302: The STA receives the training configuration information, and determines the second uplink beam based on the training configuration information.

In this embodiment of this application, the STA may receive the training configuration information, obtain the first uplink beam indicated in the training configuration information, and determine the second uplink beam based on the first uplink beam. In an example, the STA may determine that the second uplink beams are the first uplink beams, that is, the second uplink beams selected by the STA are the same as the first uplink beams. Alternatively, the STA may select some uplink beams from the first uplink beams as the second uplink beams. For example, when one first uplink beam is indicated to one STA, a width of the second uplink beam selected by the STA may be narrower than a width of the first uplink beam: when a plurality of first uplink beams are indicated to one STA, the second uplink beams selected by the STA may be a part of the plurality of first uplink beams.

Step S303: The STA sends a training frame by using the second uplink beam.

The STA sends the training frame to the AP by using the second uplink beam determined in step S302, and the STA may determine, based on the first uplink beam that is indicated in the training configuration information and that is used as a reference for the STA, the second uplink beam used to send the training frame. This prevents the STA from blindly training all beam directions, shortens a beam training time, and improves training efficiency.

Step S304: The AP receives the training frame, and determines a third uplink beam based on the training frame, where the third uplink beam is used to send uplink data.

In this embodiment of this application, the AP may determine, based on received signal quality of a plurality of training frames, some training frames that meet a preset condition, for example, select, from the plurality of training frames, training frames whose signal-to-noise ratios are greater than or equal to a specific threshold; or select, from the plurality of training frames, training frames of which mutual signal interference is less than or equal to a specific threshold. Further, the AP may determine second uplink beams used to send the training frames that meet the preset condition. The AP may determine third uplink beams based on the second uplink beams of the training frames that meet the preset condition. For example, the third uplink beams may be the second uplink beams of the training frames that meet the condition. Alternatively, the AP may select some second uplink beams from the second uplink beams that meet the preset condition as the third uplink beams. For example, in six second uplink beams for sending the training frames, four second uplink beams meet the preset condition, and the AP selects two of the four second uplink beams as the third uplink beams. It should be noted that the preset condition in this embodiment of this application may be agreed on in a protocol, or may be configured by the AP. This is not specifically limited in this embodiment of this application.

Optionally, in this embodiment of this application, the method may further include step S305: The AP sends transmission configuration information to the STA. The transmission configuration information includes third antenna configuration of a plurality of third uplink beams, one third uplink beam in the plurality of third uplink beams is an uplink beam used by a corresponding STA for uplink data transmission, and the plurality of second uplink beams include the plurality of third uplink beams. In an example of this application, the third antenna configuration of the third uplink beam may include one or more of a transmit antenna ID, a transmit sector ID, a count value, or an AVW ID used by a corresponding STA to send uplink data. Optionally, the transmission configuration information may further include one or more of a downlink beam identifier, a receive antenna ID, a receive sector ID, or an AWV ID used by the AP to receive the uplink data.

Similarly, in this embodiment of this application, a quantity of the plurality of third uplink beams may be the same as a quantity of the plurality of STAs that send uplink data. For example, the AP may indicate, to three STAs respectively, three third uplink beams used for uplink data transmission. The three third uplink beams are in a one-to-one correspondence with the three STAs. In other words, each STA is indicated to use one third uplink beam to perform uplink data transmission. In another example, in this embodiment of this application, a quantity of the plurality of third uplink beams may be greater than a quantity of the plurality of STAs that send uplink data. For example, the AP may indicate six third uplink beams to three STAs, where each STA is indicated to use two third uplink beams to send data. Alternatively, two third uplink beams may be indicated to one STA in the three STAs, two third uplink beams may be indicated to another STA, and three third uplink beams may be indicated to the remaining STA.

Corresponding to step S305, the method shown in FIG. 3 may further include step S306: The STA may further receive the transmission configuration information.

In this embodiment of this application, a transmission configuration frame may carry transmission configuration information of a plurality of STAs, and mutual interference between a plurality of third uplink beams indicated by the transmission configuration information of the plurality of STAs is relatively small. Therefore, when the plurality of STAs perform parallel uplink data transmission, that is, when the plurality of STAs perform UL MU-MIMO transmission, MU-MIMO interference is small. This can improve quality of communication between a plurality of MU-MIMO users, and improve transmission efficiency.

In this embodiment of this application, the transmission configuration information of the plurality of STAs may further include an antenna configuration of sending uplink data by each STA and an antenna configuration of receiving uplink data by the AP, so that the AP can coordinate receive antennas of the STAs, thereby avoiding a receive antenna conflict when the STA selects a receive antenna. For example, for a STA 1 and a STA 2, the AP may allocate antennas 1 and 2 of the AP to receive a signal of the STA 1, and antennas 3 and 4 of the AP to receive a signal of the STA 2. However, if the STAs select receive antennas, the STA 1 may select the antennas 1 and 2 of the AP to receive the signal of the STA 1, and the STA 2 may select the antennas 2 and 3 of the AP to receive the signal of the STA 2. Because the antenna 2 of the AP cannot point to beams of the STA 1 and the STA 2 at the same time for receiving. In this case, transmission using the antenna 2 of the AP conflicts.

Figure 4:
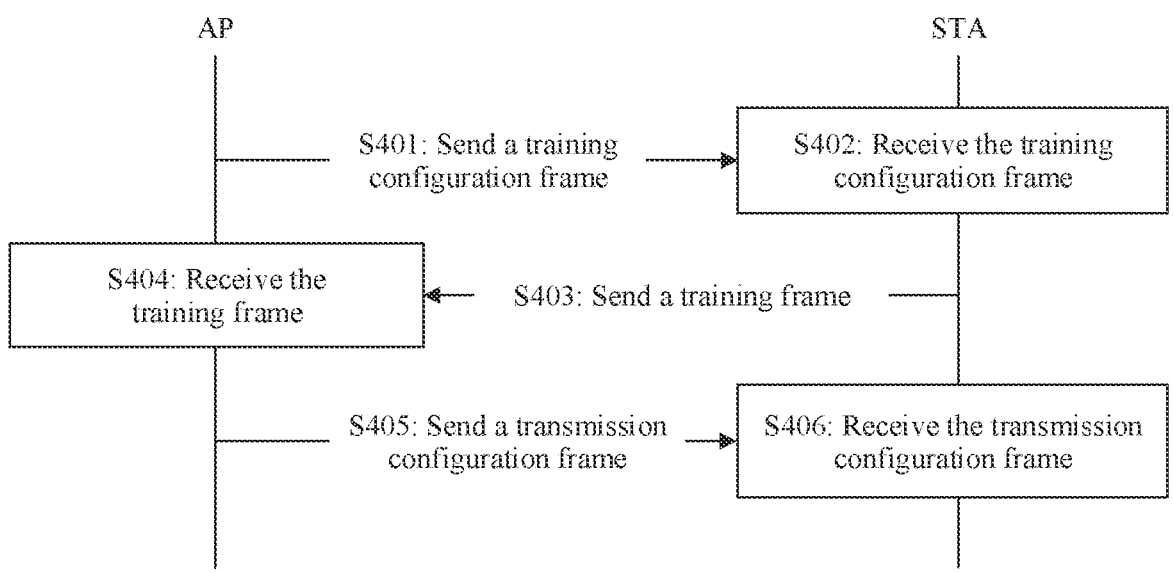
FIG. 4 is another flowchart of a beam training method according to an embodiment of this application.

As shown in FIG. 4, an embodiment of this application provides a beam training procedure. In the procedure shown in FIG. 4, a training configuration frame may be used to carry the training configuration information shown in FIG. 3, and a transmission configuration frame may be used to carry the transmission configuration information shown in FIG. 3. The procedure may be specifically as follows:

Step S401: An AP sends a training configuration frame to a STA.

In this embodiment of this application, the training configuration frame may be used to indicate a first uplink beam. In this embodiment of this application, for a process in which the AP selects the first uplink beam, refer to the description in step S301. Details are not described herein again.

In this embodiment of this application, unnecessary training overheads can be reduced by using the training configuration frame, and training efficiency can be improved by scheduling a training resource. For example, beams corresponding to spatial streams that are of a plurality of users and that do not have a spatial conflict do not need to be further trained, thereby reducing overheads. Beams with a potential conflict may be indicated in the training configuration frame, and need to be further trained. A plurality of training sequences are allocated by configuring training resources, so that a plurality of STAs can use different training sequences for parallel training, thereby improving training efficiency.

Step S402: The STA receives the training configuration frame.

Step S403: The STA sends a training frame.

In this embodiment of this application, the STA may send the training frame by using a second uplink beam, and the second uplink beam is determined based on the first uplink beam.

Step S404: The AP receives the training frame.

Step S405: The AP sends a transmission configuration frame.

Step S406: The STA receives the transmission configuration frame.

In this embodiment of this application, the AP may measure a training frame or training frames sent by one or more STAs, to obtain a set of uplink beams with low mutual interference, to form the transmission configuration frame.

In this embodiment of this application, the transmission configuration frame may carry transmission configuration information of a plurality of STAs, and mutual interference between a plurality of third uplink beams indicated by the transmission configuration information of the plurality of STAs is relatively small. Therefore, when the plurality of STAs perform parallel uplink data transmission, that is, when the plurality of STAs perform UL MU-MIMO transmission, MU-MIMO interference is small. This can improve quality of communication between a plurality of MU-MIMO users, and improve transmission efficiency.

The following provides further descriptions with reference to specific examples. As shown in FIG. 5a or FIG. 5b, the AP may send one transmission configuration frame, and the transmission configuration frame carries transmission configuration information of one or more STAs. Details are as follows:

In the example shown in FIG. 5a, the AP may first send a training configuration frame, where the training configuration frame may carry training configuration information of two STAs. The two STAs may separately obtain respective corresponding training configuration information from the training configuration frame, and then send training frames on corresponding uplink beams based on an indication of the training configuration information. After receiving the training frames sent by the two STAs, the AP may generate a transmission configuration frame based on the training frames of the two STAs. The transmission configuration frame may carry transmission configuration information of the two STAs.

In the example shown in FIG. 5b, a processing process is similar to that in the example shown in FIG. 5a. A difference lies in that, in the example shown in FIG. 5b, the transmission configuration frame sent by the AP may trigger downlink data transmission of the AP or parallel uplink data transmission of the two STAs.

It may be understood that in the examples provided in FIG. 5a and FIG. 5b, two STAs are used as an example for description, and are not intended to limit this application. In this embodiment of this application, the training configuration frame may carry training configuration information of one STA or a plurality of STAs, where "a plurality of" indicates two or more than two, and the transmission configuration frame may carry transmission configuration information of one or a plurality of STAs. It can be learned from the foregoing description that, in this embodiment of this application, transmission configuration information of one or more STAs needs to be indicated to the STAs at one time by using one transmission configuration frame. The transmission configuration frame carries excessive information at one time, and the information configuration lacks flexibility.

Figure 5C:
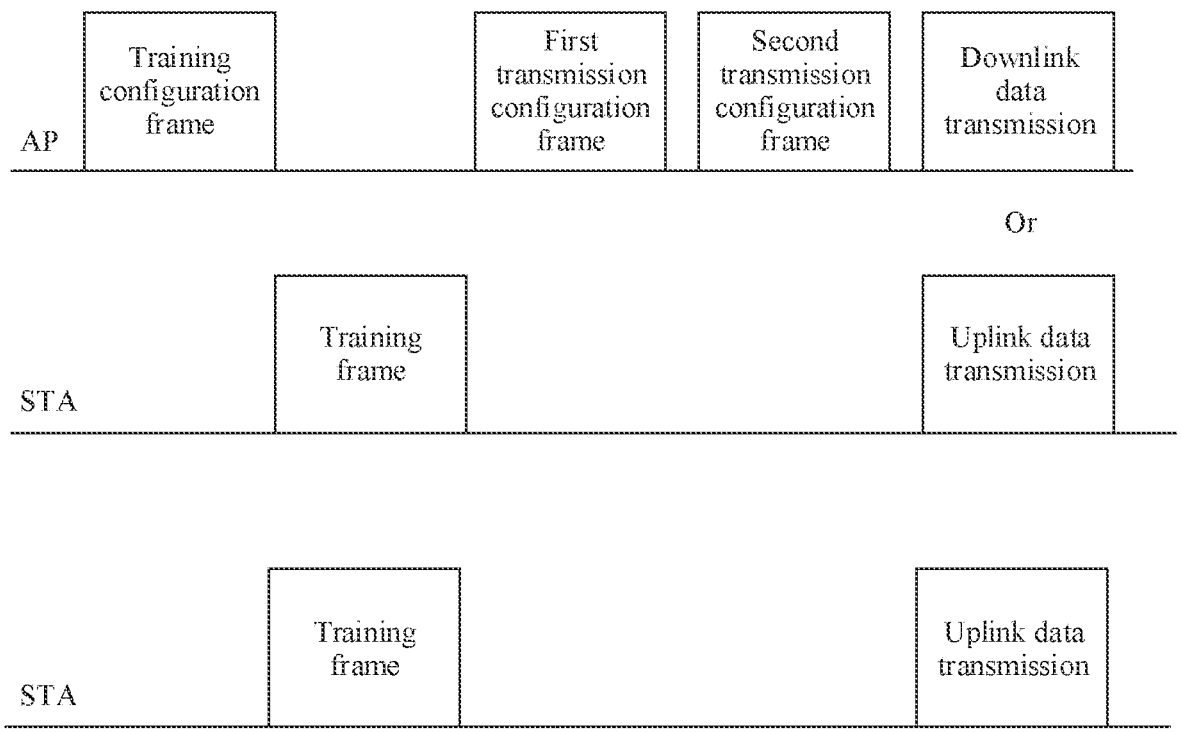

To improve flexibility of the configuration information, as shown in FIG. 5c, in an implementation, the AP may send two transmission configuration frames: a first transmission configuration frame and a second transmission configuration frame. The first transmission configuration frame may carry a basic configuration parameter, and the second transmission configuration frame may carry a parameter that limits a basic configuration. In FIG. 5c, an example in which the second transmission configuration frame triggers the downlink data transmission of the AP or the uplink data transmission of the STAs is used for description. In this embodiment of this application, that the second transmission configuration frame definitely triggers the downlink data transmission of the AP or the uplink data transmission of the STAs is not limited.

In an example of this application, the first transmission configuration frame may include a correspondence between a configuration number and transmission configuration information, and the second transmission configuration frame is used to indicate a sequence number of transmission configuration information. In this embodiment of this application, the transmission configuration information is carried in a hierarchical manner. The foregoing indication information is carried in two transmission configuration frames, so that dynamic configuration can be performed, message overheads can be reduced, and flexibility and efficiency can be improved.

For example, in this embodiment of this application, the first transmission configuration frame may include the following correspondences: A configuration number 1 corresponds to transmission configuration information 1, a configuration number 2 corresponds to transmission configuration information 2, and by analog, a configuration number N corresponds to transmission configuration information N, where N is a positive integer greater than or equal to 1. The N pieces of transmission configuration information may be the same or different. The second transmission configuration frame may include a configuration number M, and M is greater than or equal to 1 and less than or equal to N. In this embodiment of this application, the STA may separately receive the first transmission configuration frame and the second transmission configuration frame, obtain the configuration number M from the second transmission configuration frame, obtain, from the first transmission configuration frame, transmission configuration information M corresponding to the configuration number M. Finally, the STA may perform uplink data transmission by using the transmission configuration information M.

In another example of this application, the first transmission configuration frame and the second transmission configuration frame may be used to dynamically adjust an original MIMO transmission configuration. For example, the AP may indicate a peer end to use a specific dynamic transmission configuration. For example, the AP may send a first transmission configuration frame, where the first transmission configuration frame carries a configuration group numbered 1 (configuration group 1). The configuration group numbered 1 indicates the STA 1 to use an antenna 1 to perform transmission with an antenna 1 of the AP the STA 1 to use an antenna 2 to perform transmission with an antenna 2 of the AP, and the STA 2 to use an antenna 3 to perform transmission with an antenna 3 of the AP. If the antenna 2 of the AP is faulty or turned off, the AP may send a second transmission configuration frame, to adjust transmission configurations of the STA 1 and the STA 2. The second transmission configuration frame carries a configuration group numbered 1. The configuration group numbered 1 may indicate the STA 1 to use the antenna 1 to perform transmission with the antenna 1 of the AP, and the STA 2 to use the antenna 3 to perform transmission with the antenna 3 of the AP. To achieve the foregoing effect, the second transmission configuration frame may include a user group number, a configuration number, and the like. The STA 1 that receives the second transmission configuration frame determines, based on the user group number and the configuration number, that the STA 1 cannot use the antenna 2 to communicate with the antenna 2 of the AP, to enable the AP can adjust some transmission configurations of one configuration group. In this way, a transmission configuration of a STA is dynamically adjusted. Optionally, the second transmission configuration frame may further include an antenna mask of each user. For example, a bitmap 10 is used to select an antenna 1 of a user 1.

In another example of this application, the first transmission configuration frame and the second transmission configuration frame may be used to dynamically enable or disable an original MIMO transmission configuration group as a whole. For example, the AP may send a first transmission configuration frame, and the first transmission configuration frame includes a configuration group numbered 1 (configuration group 1) and a configuration group numbered 2 (configuration group 2). The configuration group numbered 1 indicates the STA 1 to use an antenna 1 to perform transmission with an antenna 1 of the AP, the STA 1 to use an antenna 2 to perform transmission with an antenna 2 of the AP, and the STA 2 to use an antenna 3 to perform transmission with an antenna 3 of the AP. The configuration group numbered 2 indicates the STA 1 to use the antenna 1 to perform transmission with the antenna 1 of the AP, and the STA 2 to use the antenna 3 to perform transmission with the antenna 3 of the AP. If the antenna 2 of the AP is faulty or turned off, the AP may send the second transmission configuration frame, where the second transmission configuration frame includes the sequence number of the configuration group 2, to disable the configuration group numbered 1. To achieve the foregoing effect, the second transmission configuration frame may include an antenna mask used by the AP. For example, a bitmap 101 is used to indicate that the AP uses the antennas 1 and 3.

Figure 6:
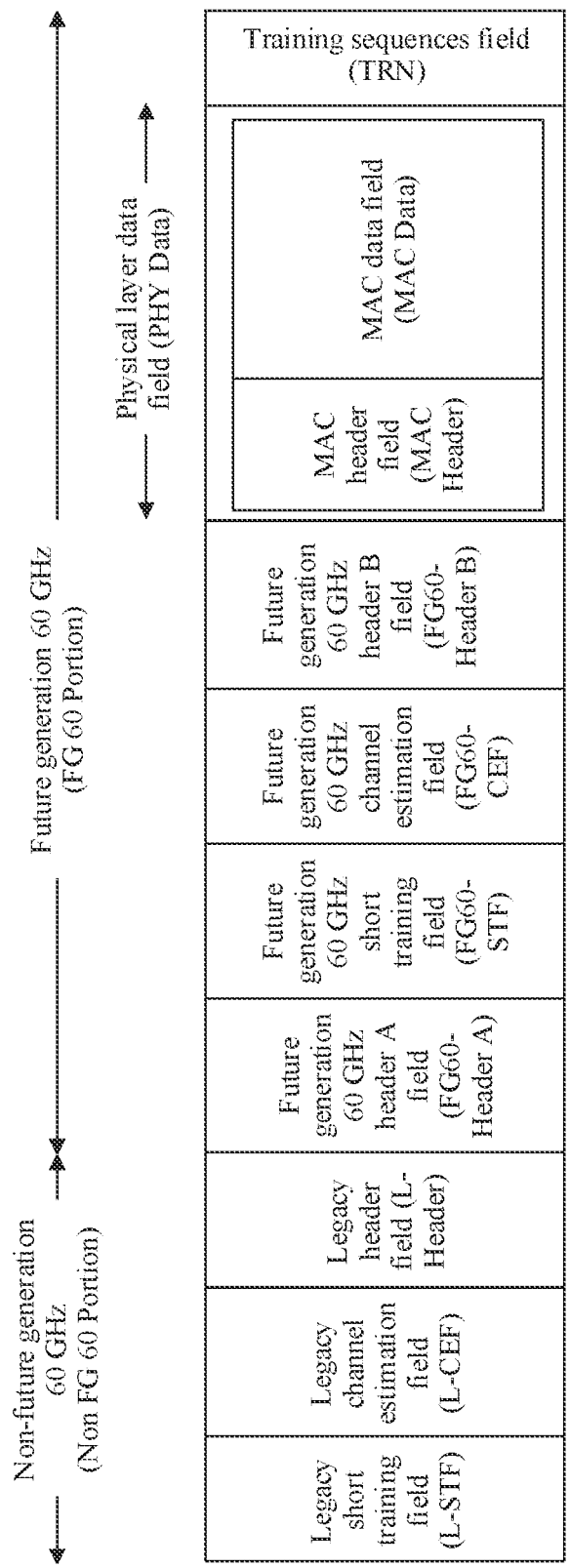
FIG. 6 is a schematic diagram of a configuration frame according to an embodiment of this application.

As shown in FIG. 6, an embodiment of this application provides a physical layer protocol data unit (Physical layer protocol data unit, PPDU). The PPDU may carry the training configuration frame or the transmission configuration frame. In an example, the PPDU may include a non-future generation 60 GHz portion (non future generation 60 GHz portion, Non FG 60 Portion) field and a future generation 60 GHz portion (future generation 60 GHz portion, FG 60 Portion)

field. The non FG 60 portion field may include a legacy short training field (legacy short training field. L-STF), a legacy channel estimation field (legacy channel estimation field, L-CEF), and a legacy header (L-Header) field. The L-STF may also be referred to as a non-enhanced directional multi-gigabit (non enhanced directional multi-gigabit, non-EDMG) short training sequence field, the L-CEF field may also be referred to as a non-EDMG channel estimation field, and the L-Header field may also be referred to as a non-EDMG header field. The FG 60 portion field may include a future generation 60 GHz headerA (future generation 60 GHz header A. FG60-Header A) field, a future generation 60 GHz short training field (future generation 60 GHz short training field, FG60-STF), a future generation 60 GHz channel estimation field (future generation 60 GHz channel estimation field, FG60-CEF), a future generation 60 GHz header B (future generation 60 GHz header B, FG60-Header B) field, a PHY data field, and a training sequences field (training sequences field, TRN). The PHY data field may include a MAC header (MAC Header) field and a MAC data (MAC Data) field.

In a possible implementation, the L-STF field, the L-CEF field, the L-Header field, and the FG60-Header A field may use a non-FG60 modulation scheme. The FG60-STF field, the FG60-CEF field, the FG60-Header B field, the PHY data field, and the TRN field may use an FG60 modulation scheme.

In this embodiment of this application, the training configuration information or the transmission configuration information may be carried in the MAC data field or the MAC header field of the PPDU. In the following embodiment, an example in which the training configuration information or the transmission configuration information is carried in the MAC data field is used for description.

In this embodiment of this application, as shown in Table 1, the training configuration frame or the transmission configuration frame may include a STA indication field and an antenna sector configuration indication field. Optionally, the training configuration frame may further include a time indication field, an uplink (uplink, UL) power indication field, a hybrid multiple-input multiple-output spatial stream mapping (Hybrid MIMO Spatial Stream Mapping) indication field, and a transmission bandwidth indication field. For forms and functions of the foregoing fields, refer to descriptions in the following Table 1, and details are not described herein.

TABLE 1

| Indication information (field) in a configuration frame | Form and function |
| --- | --- |
| STA indication | An AP indicates an ID of a STA for uplink transmission in a current session procedure. |
| Antenna sector configuration indication | One or more of a transmit antenna ID, a transmit sector ID, a CDOWN, or an AWV ID used by a STA; or one or more of a receive antenna ID, a receive sector ID, or an AWV ID used by the AP for receiving |
| UL timing advance indication (optional) | Used to indicate a sending time of each STA or a sending time of each beam, where the sending time may be an offset relative to a triggered uplink time interval agreed on in a protocol; or the sending time may be an offset relative to a time interval used by the STA in a previous multi-user transmission |
| UL power indication (optional) | Indicates a power with which the AP expects to receive signals of spatial streams, a power with which the AP expects to receive signals of uplink users, a power with which the AP expects to receive a signal of each spatial stream, and a power with which the AP expects to receive a signal of each uplink user |
| MIMO hybrid MIMO spatial stream mapping indication (optional) | for example, indicates that a first spatial stream and a second spatial stream are used to send a first bitstream, and a third spatial stream is used to send a second bitstream |
| Transmission bandwidth indication (optional) | Indicates a bandwidth format of an uplink PPDU, for example, 2.16 GHz, 4.32 GHz, 8.64 GHz, or another bandwidth manner specified in a protocol, where if the PPDU is divided into a plurality of resource blocks in frequency domain and the plurality of resource blocks are allocated to a plurality of STAs for transmission, the PPDU may further include a size and a frequency domain position of a resource block used by each STA |

It should be noted that, when the frame structure shown in Table 1 is used for the training configuration frame, "a transmit antenna ID, a transmit sector ID, a CDOWN, or an AWV ID used by aSTA" in the antenna sector configuration indication shown in Table 1 are specifically "a transmit antenna ID, a transmit sector ID, a CDOWN, or an AWV ID" that the AP recommends the STA to use. The STA may determine, based on one or more of "a transmit antenna ID, a transmit sector ID, a CDOWN, and an AWV ID", a first uplink beam recommended by the AP. The STA may determine, based on recommendations of the AP, the transmit antenna ID, the transmit sector ID, the CDOWN, the AWV ID, and the like that are used when a training frame is sent, that is, determine a second uplink beam used when the training frame is sent.

It should be noted that the frame structure shown in Table 1 may alternatively be used for the transmission configuration frame. When the frame structure shown in Table 1 is used for the transmission configuration frame. "a transmit antenna ID, a transmit sector ID, a CDOWN, or an AWV ID used by a STA" in the antenna sector configuration indication shown in Table 1 are specifically "a transmit antenna ID, a transmit sector ID, a CDOWN, or an AWV ID" that the AP recommends the STA to use to send uplink data. In this embodiment of this application, the STA may determine an uplink beam based on "a transmit antenna ID, a transmit sector ID, a CDOWN, or an AWV ID" recommended by the AR and then perform uplink data transmission by using the uplink beam. Alternatively, the STA may determine a plurality of uplink beams based on "a transmit antenna ID, a transmit sector ID, a CDOWN, or an AWV ID" recommended by the AP and the STA may select an uplink beam from the plurality of uplink beams to perform uplink data transmission. In this embodiment of this application, the training configuration frame or the transmission configuration frame may include one or more groups of transmission configuration information, and one group of transmission configuration information may correspond to one group of STAs. As shown in Table 2, one group of transmission configuration information may include an indication field and an antenna sector configuration indication field of each STA in a corresponding STA group. Specifically, in Table 2, an example in which a STA group 1 (Group1) includes two STAs, namely, a STA 1 and a STA 2 is used for description. A quantity of STAs included in each STA group is not limited in this application. Optionally, the group of transmission configuration information may further include a time indication field, a UL power indication field, a MIMO hybrid MIMO spatial stream mapping indication field, and a transmission bandwidth indication field. For forms and functions of the foregoing fields, refer to descriptions in the following Table 2, and details are not described herein.

In this embodiment of this application, when the frame structure shown in Table 2 is used for the training configuration frame or the transmission configuration frame, for description of the antenna sector configuration indication field of the STA, refer to descriptions in Table 1. Details are not described herein again.

In a specific example, the MAC header field may include a transmitter address and a receiver address. The transmitter address may be set as a basic service set identifier (basic service set identifier, BSSID) and the receiver address may be set as a broadcast address. Optionally, the MAC header field may further include an FG 60 group number (Group ID) field, and the FG 60 group number (Group ID) field includes aSTA group that currently participates in beam training. The MAC data field may include a general configuration parameter, for example, a dialog token field (dialog token field), a number of configurations field (number of configurations field, Num of configs) an uplink/downlink training indication field (DL/UL Training field), and a configurations for downlink or uplink (configurations for downlink or uplink. Configs for DLUL) field. The dialog token field is used to indicate a mark of a session in which a current transmission configuration frame is located or a mark of a session to which a training frame corresponding to an ID in an antenna sector configuration indication belongs. The num of configs field is used to indicate a

TABLE 2

| Indication information (field) in a configuration frame | Form and function |
|---|---|
| Indication of a STA 1 in a station group 1 (Group1) | An AP indicates an ID of the STA 1 for uplink transmission in a current session procedure. |
| Antenna sector configuration indication of the STA 1 in the station group 1 (Group1) | One or more of a transmit antenna ID, a transmit sector ID, a CDOWN, or an AWV ID used by the STA 1; or one or more of a receive antenna ID, a receive sector ID, or an AWV ID used by the AP for receiving |
| Indication of a STA 2 in the station group 1 (Group1) | The AP indicates an ID of the STA 2 for uplink transmission in a current session procedure. |
| Antenna sector configuration indication of the STA 2 in the station group 1 (Group1) | One or more of a transmit antenna ID, a transmit sector ID, a CDOWN, or an AWV ID used by the STA 2; and one or more of a receive antenna ID, a receive sector ID, or an AWV ID used by the AP for receiving |
| . . . | |
| Indication of a STA n in Group1 | An AP indicates an ID of the STA n for uplink transmission in a current session procedure. |
| Antenna sector configuration indication of the STA n in Group1 | One or more of a transmit antenna ID, a transmit sector ID, a CDOWN, or an AWV ID used by the STA n; and one or more of a receive antenna ID, a receive sector ID, or an AWV ID used by the AP for receiving |
| UL timing advance indication (optional) | Used to indicate a sending time of each STA or a sending time of each beam, where the sending time may be an offset relative to a trigger-uplink time interval agreed on in a protocol; or the sending time may be an offset relative to a time interval used by the STA in a previous multi-user transmission |
| UL power indication (optional) | Indicates a power with which the AP expects to receive a signal of each spatial stream, a power with which the AP expects to receive a signal of each uplink user, a power with which the AP expects to receive a signal of each spatial stream, and a power with which the AP expects to receive a signal of each uplink user |
| MIMO hybrid MIMO spatial stream mapping indication (optional) | for example, indicates that a first spatial stream and a second spatial stream are used to send a first bitstream, and a third spatial stream is used to send a second bitstream |
| Transmission bandwidth indication (optional) | Indicates a bandwidth format of an uplink PPDU, for example, 2.16 GHz, 4.32 GHz, 8.64 GHz, or another bandwidth format specified in a protocol, where if the PPDU is divided into a plurality of resource blocks in frequency domain and the plurality of resource blocks are allocated to a plurality of STAs for transmission, the PPDU may further include a size and a frequency domain position of a resource block used by each STA | quantity of groups of MIMO configurations. The DL/UL training field is used to indicate whether the AP or STA sends a training sequence in a training process. The configs for DL/UL field is used to indicate that a current configuration is used for a downlink (downlink, DL), an uplink (uplink, UL), or both a DL and a UL. In addition, when the configs for DL/UL field is used to indicate that the current configuration can be used for both the DL and the UL, configuration information carried in the transmission configuration frame may be used to provide uplink and downlink transmission beam configurations for a station with antenna or beam uplink-downlink reciprocity. That is, an indicated beam may be used for receiving in the downlink, and may be used for sending in the uplink. The antenna or beam uplink-downlink reciprocity means that an optimal uplink transmit antenna may also be an optimal downlink receive antenna.

Figure 7A:
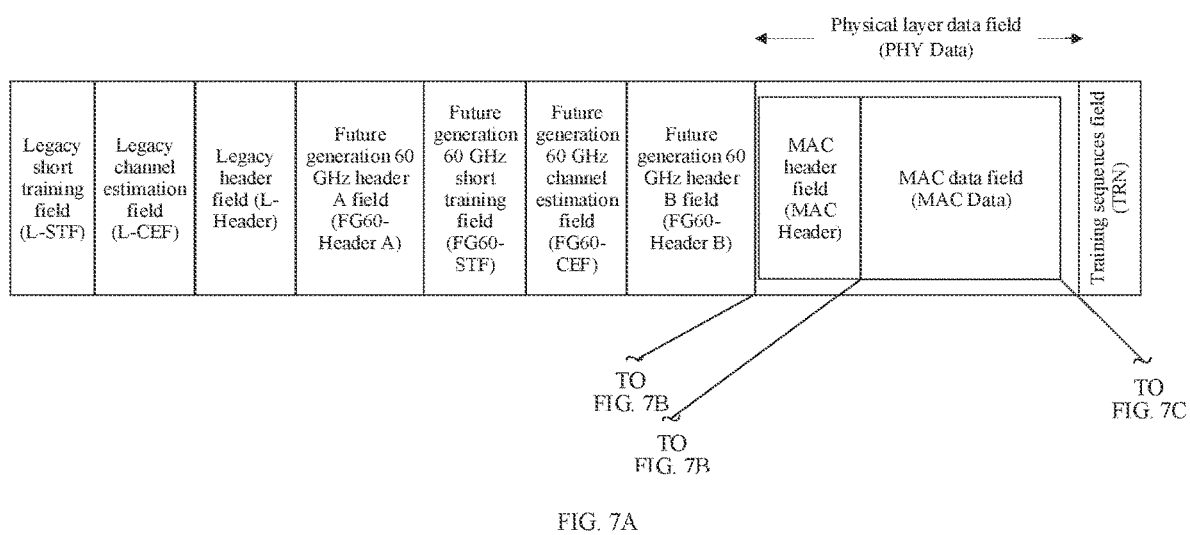
FIG. 7A to FIG. 7C are a schematic diagram of a transmission configuration frame according to an embodiment of this application.
Figure 7B:
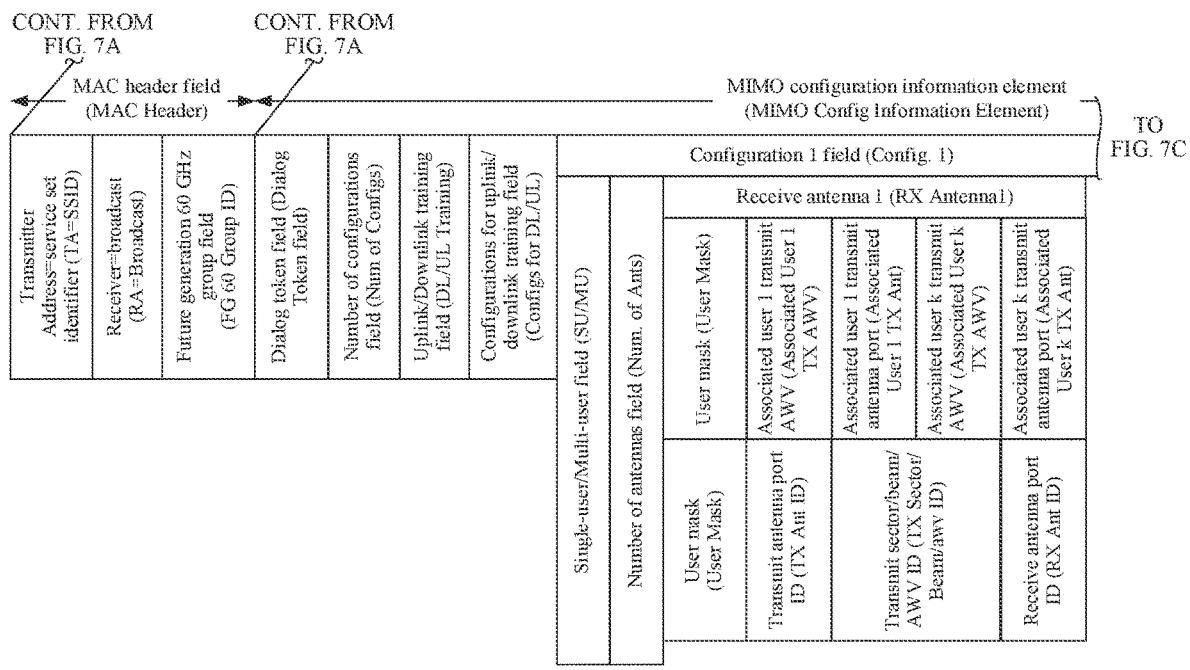
Figure 7C:
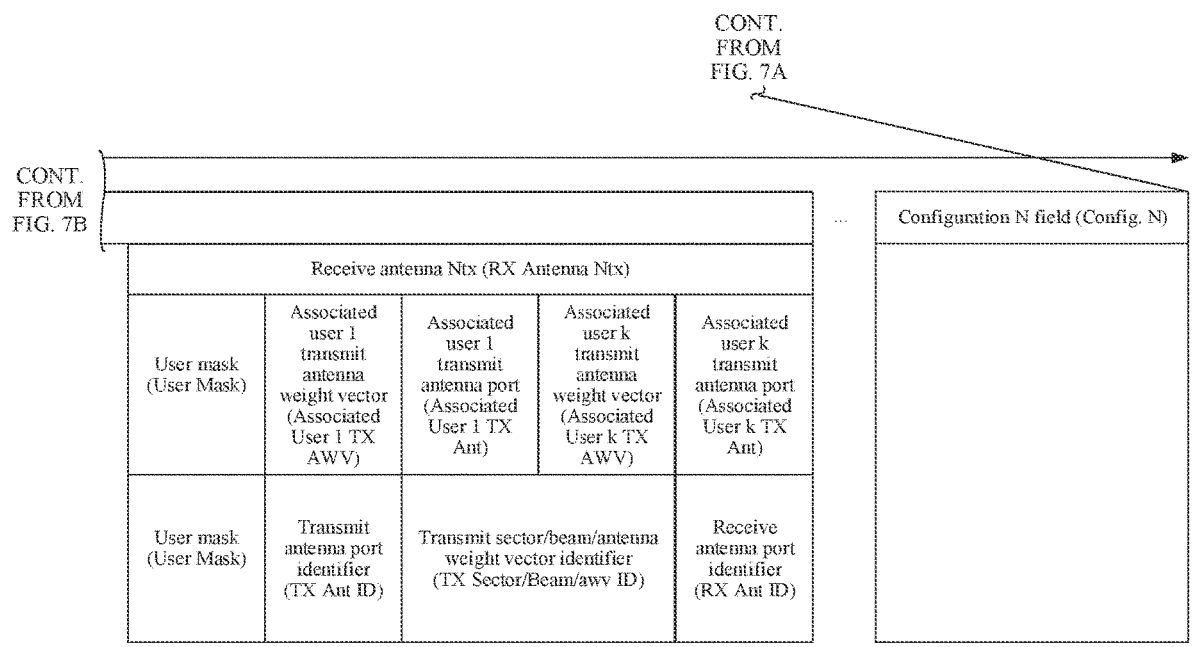
Figure 8A:
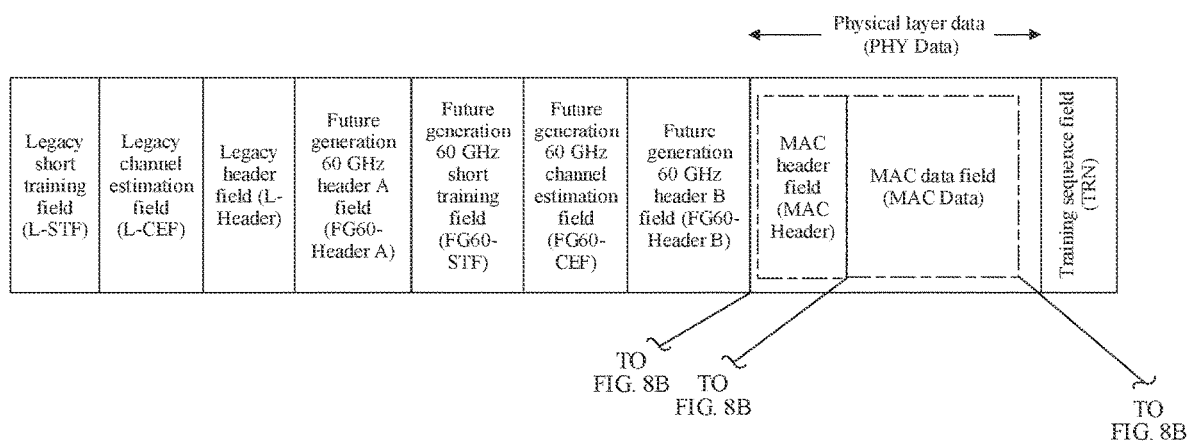
FIG. 8A and FIG. 8B are another schematic diagram of a transmission configuration frame according to an embodiment of this application.
Figure 8B:
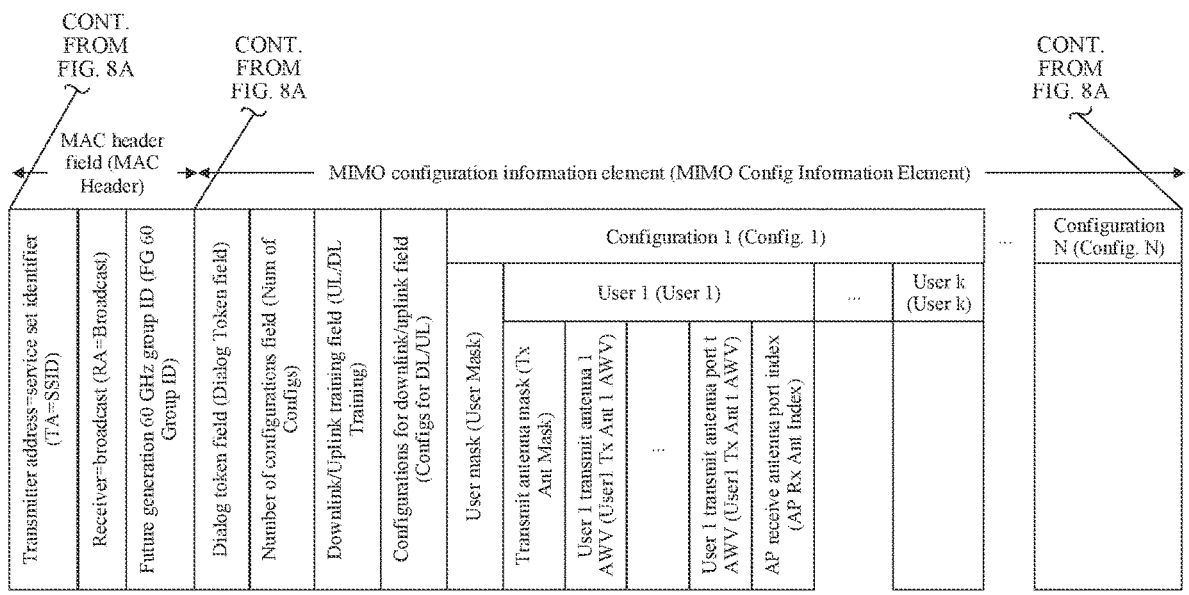

In this embodiment of this application, the transmission configuration frame may carry transmission configuration information of one or more groups of STAs. In this embodiment of this application, two structures of the transmission configuration frame are provided. In structure 1, a receive antenna of an AP is used as an index to provide configuration information, as shown in FIG. 7A to FIG. 7C. In a structure 2, a STA is used as an index to provide configuration information, as shown in FIG. 8A and FIG. 8B. It may be understood that the frame structure shown in FIG. 7A to FIG. 7C or FIG. 8A and FIG. 8B may also be used for the training configuration frame. In this embodiment of this application, an example in which the frame structure shown in FIG. 7A to FIG. 7C or FIG. 8A and FIG. 8B is used for the transmission configuration frame is used for description, and is not intended to limit this application.

In the structure 1, the receive antenna of the AP is used as an index to provide configuration information. As shown in FIG. 7A to FIG. 7C, the transmission configuration frame may include a plurality of configuration (configuration, Config.) fields, and each Config. field may correspond to transmission configuration information of one group of STAs. Structures of all Config. fields may be the same. In this embodiment of this application, a Config1, field in FIG. 7A to FIG. 7C is used as an example for description.

As shown in FIG. 7A to FIG. 7C, the Config1, field may include an SU/MU field, a number of antennas (Num of antennas) field, a receive antenna (RX Antenna) 1 field, an RX Antenna 2 field, to an RX Antenna N field, where N is a positive integer greater than or equal to 1.

The SU/MU field is used to indicate that a current transmission configuration is a single-user MIMO (single-user MIMO, SU MIMO) transmission configuration or a multi-user MIMO (multi-user, MU MIMO) transmission configuration. For example, when the SU/MU field is 1, it may indicate that the current transmission configuration is an SU MIMO transmission configuration; when the SUMU field is 0, it may indicate that the current transmission configuration is an MU-MIMO transmission configuration.

The number of antennas field may be used to represent a quantity of receive antennas on an AP side that are involved in a current configuration. For example, in a configuration Config1. field, there are N involved receive antennas of an AP, which are a receive antenna RX Antenna 1, an RX Antenna 2, to an RX Antenna N.

Structures of the N fields from the receive antenna (RX Antenna) 1 field to the receive antenna (RX Antenna) N field may be the same. In this embodiment of this application, the receive antenna (RX Antenna) 1 field is used as an example for description.

The receive antenna (RX Antenna) 1 field is used to indicate, under reception of the receive antenna 1 of the AP, an antenna weight vector (AWV) and a transmit antenna port (ANT) that are used for transmitting uplink data when K STAs perform parallel uplink transmission.

For example, in this embodiment of this application, if the SU/MU field indicates that the current transmission configuration is an SU MIMO transmission configuration, the RX Antenna 1 field may include a user mask (user mask) field, a transmit antenna port ID (TX Ant ID) field, a transmit sector/beam/antenna weight vector identifier (TX Sector/Beam/AWV ID) field, a receive antenna port identifier (RX Ant ID) field, and the like.

If the SU/MU field indicates that the current transmission configuration is an MU-MIMO transmission configuration, the RX Antenna 1 field may include a user mask (user mask) field, an associated user 1 transmit antenna weight vector (Associated user1 TX AWV) and an associated user 1 transmit antenna port (Associated user1 TX Ant), an associated user 2 transmit antenna weight vector (Associated user2 TX AWV) and an associated user 2 transmit antenna port (Associated user2 TX Ant), and by analog, an associated user k transmit antenna weight vector (Associated userk TX AWV) and an associated user k transmit antenna port (Associated userk TX Ant), where k is a positive integer greater than or equal to 1.

In the structure 2, a to-be-configured STA is used as an index to provide configuration information. As shown in FIG. 8A and FIG. 8B, the transmission configuration frame may include a plurality of configuration (configuration, Config.) fields, and each Config. field may correspond to transmission configuration information of one group of STAs. All Config. fields include same information. In this embodiment of this application, a Config1. field in FIG. 8A and FIG. 8B is used as an example for description.

As shown in FIG. 8A and FIG. 8B, the Config1. field may include a user mask (User Mask) field, a user 1 (User1) field, a user 2 (User2) field, and by analog, a user k (User k) field. All user fields include same content. The user 1 (User1) field is used as an example for description below.

The user 1 field may include a transmit antenna port mask (TX Ant Mask) field, a user 1 transmit antenna port 1 antenna weight vector (User1 Tx Ant 1 AWV) field, a user 1 transmit antenna port 2 antenna weight vector (User1 TX Ant 2 AWV) field, to a user 1 transmit antenna port t antenna weight vector (User1 Tx Ant t AWV) field.

Optionally, the user 1 field may further include an associated AP receive antenna index (Associated AP Rx Ant Index) field. The associated AP receive antenna index field is used to indicate an antenna number used when the AP receives uplink data of the user 1.

Because there is a specific mapping or association relationship between an antenna and a radio frequency chain, an antenna is generally not disabled. When a radio frequency chain may be disabled or connected to another Ant, the antenna may fail in reception. Therefore, to some extent, the RX ANT index field may be used to indicate availability of the radio frequency chain. In this embodiment of this application, all receive antennas on the AP side that are indicated by the RX ANT index field are available. Compared with a case in which a STA selects a receive antenna, this can avoid unnecessary sending by the STA. For example, when the AP is in power saving mode and a receive antenna port 1 is disabled, the AP may be prevented from indicating the receive antenna port 1 to the STA by using the RX ANT index field. In addition, the STA may adjust a transmit antenna direction based on the RX ANT index field, to better align with a receive antenna corresponding to the AP.

In the structure 1 or the structure 2, the user mask (user mask) field may be used to indicate a STA involved in configuration information of a current Config, field. For example, if one STA group includes a maximum of 16 STAs, the user bitmap mask may include 16 bits. Each bit corresponds to one STA, and is used to indicate whether the corresponding STA is involved. When a bit is 1, a STA corresponding to the bit may use information in the configuration field. This may be referred to as a mode in which the STA is allowed to use information in the configuration field. When a bit is 0, a STA corresponding to the bit may be forbidden from using information in the configuration field. This may be referred to as a mode in which the STA is not allowed to use information in the configuration field. A quantity of bits corresponding to the user mask field may be fixed or variable.

In this embodiment of this application, after the user mask field specifies a STA related to the configuration information, a transmit antenna mask (tx ant mask) field of each STA may be indicated to the STA. Optionally, the transmission configuration frame further includes an AP antenna number information field (for example, RX Ant ID).

In this embodiment of this application, the AP may send, in a unicast manner, a broadcast manner, a multicast manner, or the like, the transmission configuration frame in the procedure shown in FIG. 4. Optionally, after receiving the transmission configuration frame, the STA may further send an acknowledgment frame to the AP. This application provides the following examples to describe a manner of sending the acknowledgment frame by the STA.

Example 1: After Receiving the Transmission Configuration Frame, the STA Replies to the AP with an Acknowledgment Frame In an example of this application, if the AP sends the transmission configuration frame to a plurality of STAs in a unicast manner, after receiving the transmission configuration frame, each STA may immediately reply to the AP with an acknowledgment frame. If the AP sends the transmission configuration frame to a plurality of STAs in a broadcast or multicast manner, after receiving the transmission configuration frame, each STA may determine, in the following manner, a time point at which each STA sends an acknowledgment frame: The STAs may determine, based on positions in which the corresponding STAs appear in the transmission configuration frame, time points at which the plurality of STAs send acknowledgment frames, and send the acknowledgment frames at the corresponding time points. For example, the AP sends the transmission configuration frame to three STAs in a broadcast or multicast manner, and the three STAs are a STA 1, a STA 2, and a STA 3. The transmission configuration frame sequentially includes indication information of the STA 1, indication information of the STA 2, and indication information of the STA 3. In this case, the STA 1 may determine, based on a position in which the STA 1 appears in the transmission configuration frame, that a time point at which the STA 1 replies with an acknowledgment frame is a first time, the STA 2 may determine, based on a position in which the STA 2 appears in the transmission configuration frame, that a time point at which the STA 2 replies with an acknowledgment frame is a second time, and the STA 3 may determine, based on a position in which the STA 3 appears in the transmission configuration frame, that a time point at which the STA 3 replies with an acknowledgment frame is a third time. The STA 1, the STA 2, and the STA 3 each may reply with an acknowledgment frame at a corresponding time point.

In an example of this application, the AP may alternatively add indication information to the transmission configuration frame, and the indication information is used to indicate a manner of replying with an acknowledgment frame by the STA. The STA may determine, based on the indication information carried in the transmission configuration frame, the manner of replying with the acknowledgment frame.

In an example of this application, the AP may send a first frame to the STA, where the first frame carries the transmission configuration frame. If the STA determines, after receiving the first frame, that the transmission configuration frame carried in the first frame has been received, the STA replies to the AP with a second frame. For example, the first frame may be a request to send (request to send, RTS) frame, and the second frame may be a clear to send (clear to send, CTS) frame, for example, a multi-user CTS frame.

Example 2: The AP Requires the STA to Send an Acknowledgment Frame Before Performing Uplink Data Transmission In this embodiment of this application, before the AP needs to perform MU-MIMO transmission, the AP may send a control frame, and the control frame indicates a MIMO configuration in a specific user group. If the AP does not receive a reply of the STA to the transmission configuration information, the AP may consider that the STA may not receive the corresponding transmission configuration frame. When the STA does not receive the transmission configuration frame, the AP may resend the corresponding transmission configuration frame. Alternatively, the AP may remove the STA from the specific configuration of the MU-MIMO user group. Alternatively, the AP performs MIMO training again and notifies a user again.

If the AP sends a poll frame or an RTS frame that is of a control frame and that includes a specific transmission configuration or a newly defined control frame that includes a specific transmission configuration, but does not receive a control response that the AP expects the STA to make, for example, the AP indicates the STA to perform uplink transmission in a specific mode, but the AP does not receive uplink transmission from the STA or does not receive uplink transmission that is in a specific mode, the AP may consider that the STA does not successfully receive the configuration, or the AP resends the configuration or performs reconfiguration.

Example 3: The STA Explicitly Notifies the AP that the STA Lacks Configuration Information of a Specific Group When the AP sends a control frame, and the control frame indicates MIMO transmission configuration group information (number) in a specific user group, if the STA has not received corresponding MIMO transmission configuration group information, or has not received a MIMO transmission configuration frame including a specific transmission configuration indication, the STA may send a transmission configuration request frame including the specific transmission configuration indication (number). The AP sends the MIMO transmission configuration frame including the specific transmission configuration indication (number), or the AP performs MIMO transmission configuration again. Alternatively, the STA sends a protocol-agreed frame, indicating that the specific transmission configuration indication (number) cannot be identified.

In this embodiment of this application, the AP may generate the transmission configuration frame based on a training frame of a session, or the AP may generate the transmission configuration frame based on training frames of a plurality of sessions. The transmission configuration frame may carry one session identifier, or carry a plurality of session identifiers. For example, the session identifier may be a dialog token identifier. In an example, when the transmission configuration frame is generated based on training frames of a plurality of sessions, the transmission configuration frame may include transmission configuration information, the transmission configuration information further includes a plurality of session identifiers, and the plurality of session identifiers include identifiers of the sessions in which the plurality of training frames are located.

Figure 9:
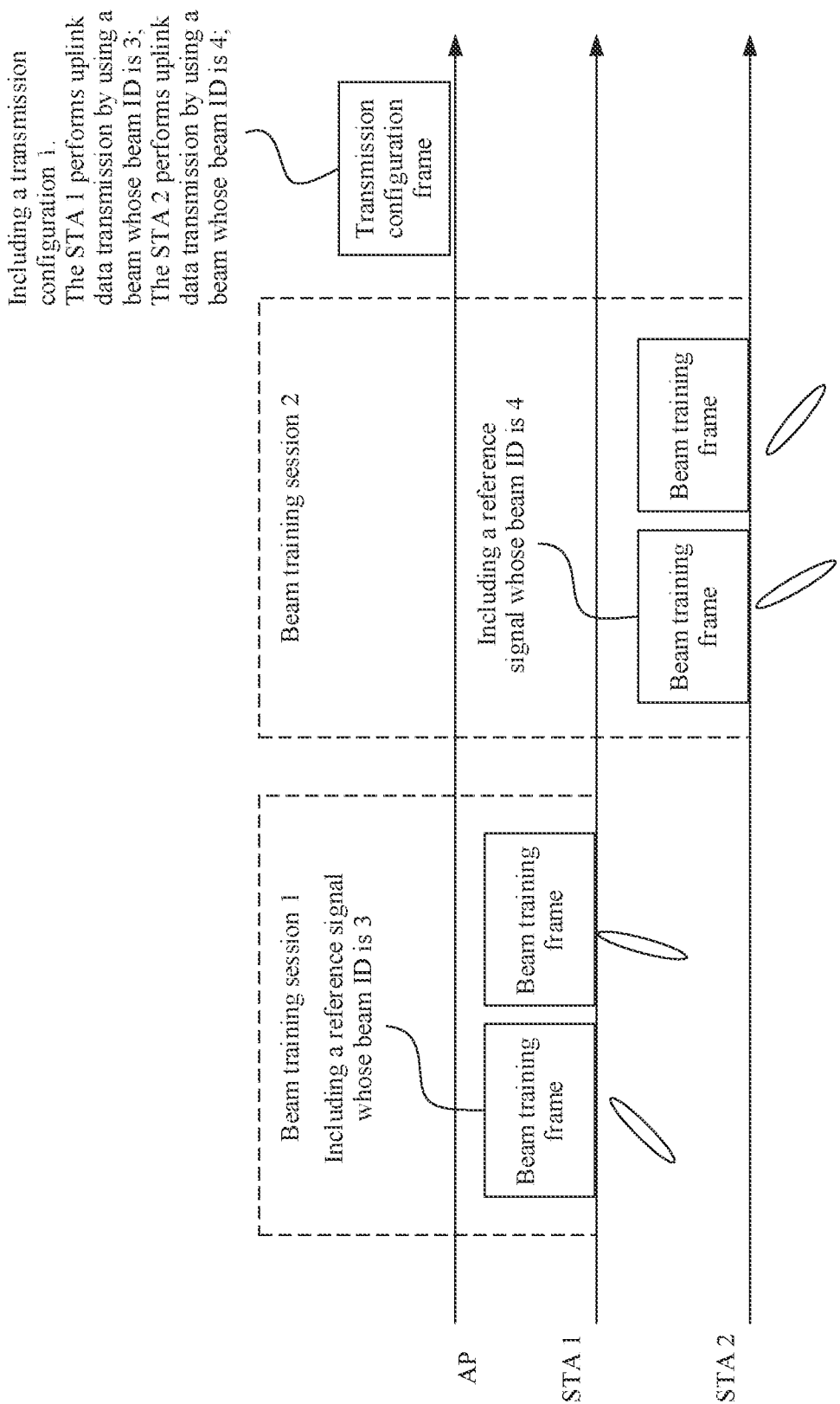
FIG. 9 shows a session procedure according to an embodiment of this application.

In this embodiment of this application, if the AP generates the transmission configuration frame based on the training frames of the plurality of sessions, as shown in FIG. 9, this application provides a specific example. In a session numbered 1, the AP performs MIMO training on users including a STA 1, the STA 1 may send a beam training frame to the AP, and the beam training frame may include a reference signal whose beam ID is 3. In a session numbered 2, the AP performs MIMO training on users including a STA 2, the STA 2 may send a beam training frame to the AP, and the beam training frame may include a reference signal whose beam ID is 4. Optionally, the session numbered 2 may include or may not include the training frame of the STA 1. In this embodiment of this application, the AP may generate the transmission configuration frame based on beam training results of the session numbered 1 and the session numbered 2. The transmission configuration frame may include a transmission configuration 1. The transmission configuration 1 may specifically indicate that the STA 1 performs uplink data transmission by using a beam whose beam ID is 3, and that the STA 2 performs uplink data transmission by using a beam whose beam ID is 4.

It should be noted that the MIMO training in this embodiment of this application may also be applied to a case in which the STA has only one antenna, or may be applied to a case in which the STA has a plurality of antennas. The case in which the STA has only a single antenna may also be referred to as single-input multiple-output (single input and multiple output, SIMO) or multiple-input single-output (multiple output and single input, MISO). In addition, a configuration training result may be used for multi-user transmission, or may be used for single-user transmission.

It can be learned from the foregoing description that, in this embodiment of this application, the AP may determine, by using a plurality of SU-MIMO training results, configuration information used during MU-MIMO transmission, and does not need to determine MIMO configuration information each time a plurality of users are centrally trained, thereby reducing overheads caused by training.

In this embodiment of this application, after the MIMO training frame of the session numbered 2 is sent, the AP may send the MIMO transmission configuration frame. For an AWV ID of each user, there is a session identifier, and the session identifier is used to indicate the STA to use, during transmission, an antenna ID, a sector ID, a beam ID, or the like in a training frame corresponding to the session identifier. For example, as shown in FIG. 10, the session identifier may be carried in a dialog token field.

In this embodiment of this application, in a UL MU-MIMO scenario, a solution for a user training, selection, and configuration process is provided. An MU-MIMO transmission configuration method may include: The AP includes one or more groups of spatial configuration information in MIMO selection information, where each group of spatial configuration information includes one or more user identifiers and one or more uplink transmit antenna identifiers, and a transmit beam identifier and a receive antenna identifier are included for each uplink transmit antenna. The AP uses the spatial configuration information to indicate the STA to perform uplink transmission. After the information is delivered to the STA, the STA may perform UL MU-MIMO transmission based on the configuration information. In addition, this embodiment of this application further provides a method for acknowledging the configuration information. Based on an acknowledgment procedure, the STA can perform MU-MIMO transmission when obtaining the configuration information, thereby improving accuracy.

It can be learned from the foregoing description that, in this embodiment of this application, the AP indicates the plurality of STAs to perform, based on a beam mode specified in the MIMO transmission configuration frame (or trigger frame), uplink or downlink transmission with low inter-user interference. In this way, inter-beam transmission interference can be reduced, and multi-user multi-stream parallel transmission can be implemented, and uplink or downlink transmission efficiency can be improved.

The foregoing describes in detail the beam training method in the embodiments of this application. The following describes a beam training apparatus in the embodiments of this application.

The embodiments of this application describe in detail a schematic structure of a beam training apparatus on an AP side.

Figure 11:
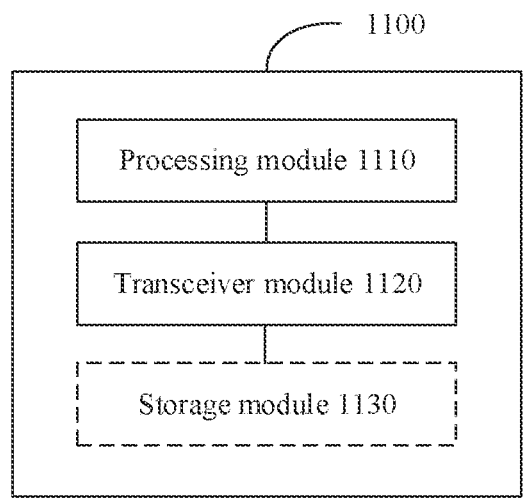
FIG. 11 is a schematic diagram of a beam training apparatus according to an embodiment of this application.

In an example, FIG. 11 is a schematic block diagram of a beam training apparatus 1100 according to an embodiment of this application. The beam training apparatus 1100 in this embodiment of this application may be the AP in the foregoing method embodiments, or may be one or more chips in the AP. The apparatus 1100 may include a processing module 1110 and a transceiver module 1120. Optionally, the apparatus 1100 may further include a storage module 1130.

For example, the processing module 1110 may be configured to perform the action of determining the third uplink beams based on the training frame in step S304 in the foregoing method embodiments.

The transceiver module 1120 may be configured to perform steps S301 and S305, perform steps S302 and S306, perform steps S401, S404, and S405, or perform steps S402 and S406 in the foregoing method embodiments.

Alternatively, the apparatus 1100 may be configured as a universal processing system, which, for example, is generally referred to as a chip. The processing module 1110 may include one or more processors that provide a processing function. The transceiver module 1120 may be, for example, an input/output interface, a pin, or a circuit. The input/output interface may be responsible for information exchange between the chip and the outside. For example, the input/output interface may output a training configuration frame to another module outside the chip for processing. The processing module may execute a computer-executable instruction stored in the storage module, to implement a function of the AP or the STA in the foregoing method embodiments. In an example, the storage module 1130 optionally included in the apparatus 1100 may be a storage unit in the chip, such as a register or a cache. Alternatively, the storage module 1130 may be a storage unit that is in the AP but outside the chip, such as a read-only memory (read-only memory, ROM for short) or another type of static storage device that can store static information and a static instruction, or a random access memory (random access memory, RAM for short).

Figure 12:
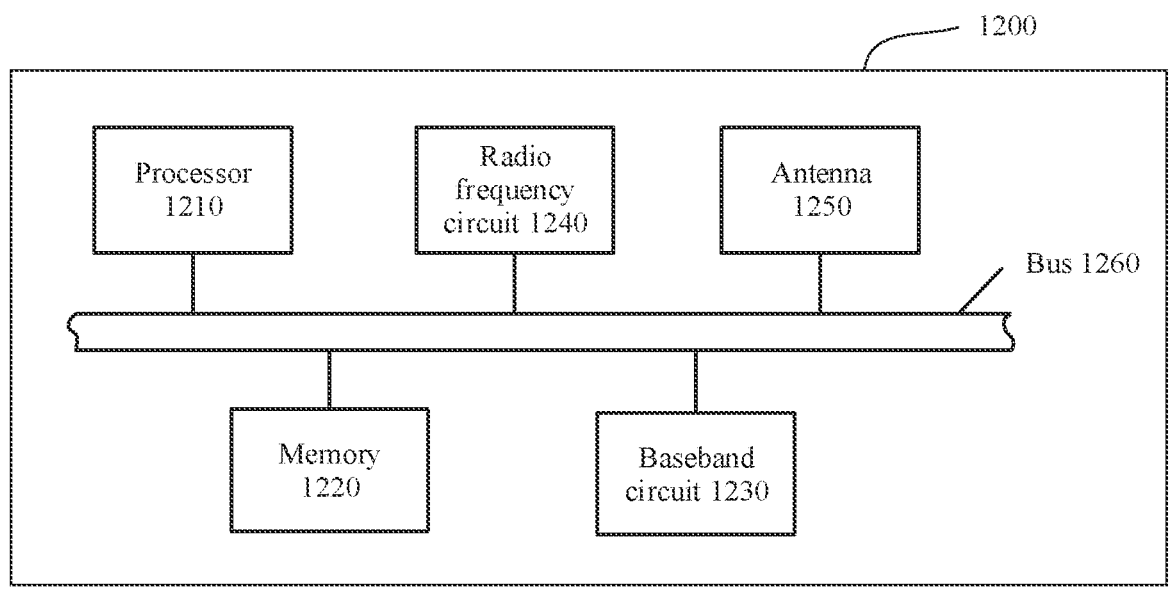
FIG. 12 is a schematic diagram of a beam training apparatus according to an embodiment of this application.

In another example, FIG. 12 is a schematic block diagram of another beam training apparatus 1200 according to an embodiment of this application. The apparatus 1200 in this embodiment of this application may be the AP in the foregoing method embodiments, and the apparatus 1200 may be configured to perform some or all functions of the AP in the foregoing method embodiments. The apparatus 1200 may include a processor 1210, a baseband circuit 1230, a radio frequency circuit 1240, and an antenna 1250. Optionally, the apparatus 1200 may further include a memory 1220. All the components of the apparatus 1200 are coupled together by using a bus 1260. The bus 1260 includes a data bus, and further includes a power bus, a control bus, and a status signal bus. However, for clear description, various types of buses in the figure are marked as the bus 1260.

The processor 1210 may be configured to control the AP, and perform processing that is performed by the AP in the foregoing embodiments. The processor 1210 may perform processing processes related to the AP in the foregoing method embodiments and/or other processes in the technology described in this application, and may further run an operating system, manage the bus, and execute a program or an instruction stored in the memory.

The baseband circuit 1230, the radio frequency circuit 1240, and the antenna 1250 may be configured to support the AP in sending/receiving information to/from the STA in the foregoing embodiments, to support the AP in performing wireless communication with the STA. In an example, a training frame from the STA may be received by the antenna 1250. Then, the training frame is processed by the radio frequency circuit 1240 through processing such as filtering, amplification, down-conversion, and digitization, processed by the baseband circuit 1230 through baseband processing such as decoding and protocol-based data de-encapsulation, and processed by the processor 1210, to determine, based on the training frame, a plurality of third uplink beams used by a plurality of STAs to send uplink data. In still another example, the processor 1210 may generate training configuration information and transmission configuration information, the baseband circuit 1230 performs baseband processing such as protocol-based encapsulation and encoding on the two pieces of information, and the radio frequency circuit 1240 further performs radio frequency processing such as analog conversion, filtering, amplification, and up-conversion on the two pieces of information. Then, the two pieces of information are transmitted through the antenna 1250.

The memory 1220 may be configured to store program code and data of the AP, and the memory 1220 may be the storage module 1130 in FIG. 11. It may be understood that the baseband circuit 1230, the radio frequency circuit 1240, and the antenna 1250 may be further configured to support communication between the AP and another network entity, for example, communication between the AP and a STA. The memory 1220 in FIG. 12 is shown as being separated from the processor 1210. However, a person skilled in the art easily understands that the memory 1220 or any part of the memory may be located outside the beam training apparatus 1200. For example, the memory 1220 may include a transmission cable and/or a computer product separated from a wireless node. These media may be accessed by the processor 1210 by using the bus 1260. Alternatively, the memory 1220 or any part of the memory may be integrated into the processor 1210. For example, the memory or any part of the memory may be a cache and/or a general-purpose register.

It may be understood that FIG. 12 shows only a simplified design of the AP For example, in actual application, the AP may include any quantity of transmitters, receivers, processors, memories, and the like, and all APs that can implement the present invention fall within the protection scope of the present invention.

In a possible implementation, the beam training apparatus may also be implemented by using one or more field-programmable gate arrays (field-programmable gate array, FPGA), programmable logic devices (programmable logic device, PLD), controllers, state machines, gate logic, discrete hardware components, any other suitable circuits, or any combination of circuits that can perform various functions described in this application. In still another example, an embodiment of this application further provides a computer storage medium. The computer storage medium may store a program instruction used to indicate any one of the foregoing methods, so that a processor executes the program instruction to implement the method and the function related to the AP in the foregoing method embodiments.

The embodiments of this application describe in detail a schematic structure of a beam training apparatus on a STA side.

Figure 13:
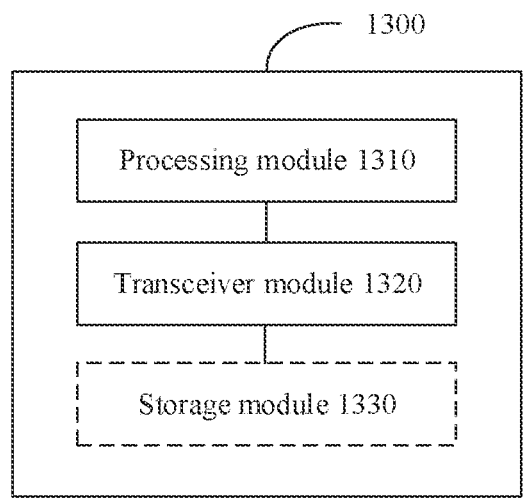
FIG. 13 is a schematic diagram of a beam training apparatus according to an embodiment of this application.

In an example, FIG. 13 is a schematic block diagram of a beam training apparatus 1300 according to an embodiment of this application. The apparatus 1300 in this embodiment of this application may be the STA in the foregoing method embodiments, or may be one or more chips in the STA. The apparatus 1300 may be configured to implement some or all functions of the STA in the foregoing method embodiments. The apparatus 1300 may include a processing module 1310 and a transceiver module 1320. Optionally, the apparatus 1300 may further include a storage module 1330.

For example, the processing module 1310 may be configured to perform the action of determining the second uplink beam based on the training configuration information in step S302 in the foregoing method embodiments.

The transceiver module 1320 may be configured to perform the action of receiving the training configuration information in step S302, perform step S303, perform step S306, perform step S402, perform step S403, or perform step S406 in the foregoing method embodiments.

Alternatively, the apparatus 1300 may be configured as a universal processing system, which, for example, is generally referred to as a chip. The processing module 1310 may include one or more processors that provide a processing function. The transceiver module may be, for example, an input/output interface, a pin, or a circuit. The input/output interface may be responsible for information exchange between the chip system and the outside. For example, the input/output interface may output a training frame to another module outside the chip for processing. The one or more processors may execute a computer-executable instruction stored in the storage module, to implement a function of the STA in the foregoing method embodiments. In an example, the storage module 1330 optionally included in the apparatus 1300 may be a storage unit in the chip, such as a register or a cache. Alternatively, the storage module 1330 may be a storage unit that is in the STA but outside the chip, such as a read-only memory (read-only memory, ROM for short) or another type of static storage device that can store static information and a static instruction, or a random access memory (random access memory, RAM for short).

Figure 14:
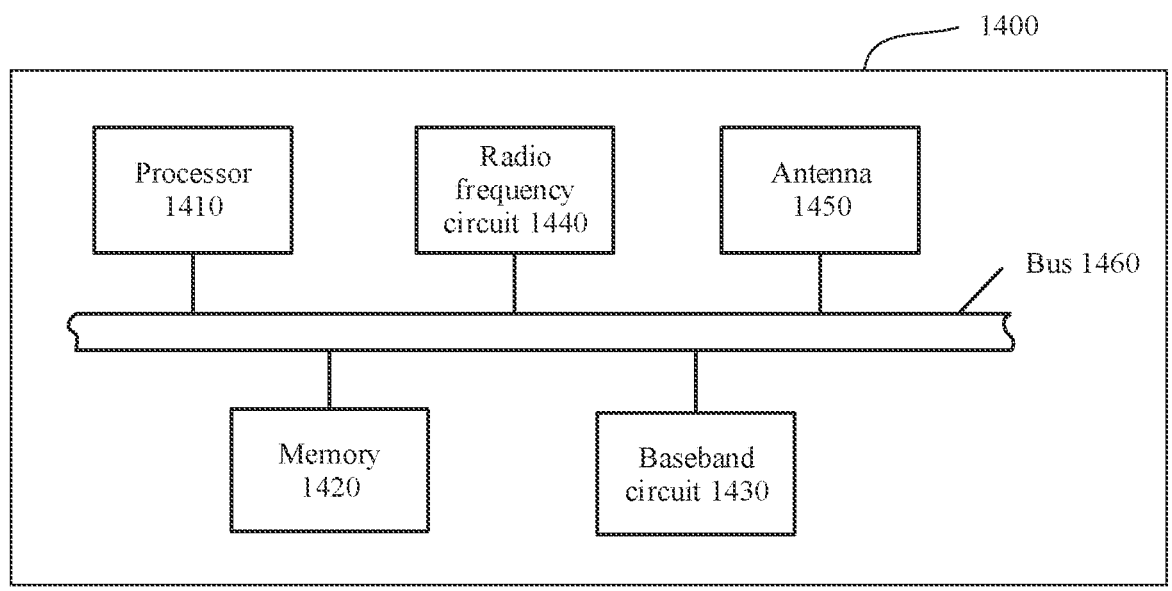
FIG. 14 is a schematic diagram of a beam training apparatus according to an embodiment of this application.

In another example, FIG. 14 is a schematic block diagram of another beam training apparatus 1400 according to an embodiment of this application. The apparatus 1400 in this embodiment of this application may be the STA in the foregoing method embodiments, and the apparatus 1400 may be configured to perform some or all functions of the STA in the foregoing method embodiments. The apparatus 1400 may include a processor 1410, a baseband circuit 1430, a radio frequency circuit 1440, and an antenna 1450. Optionally, the apparatus 1400 may further include a memory 1420. All the components of the apparatus 1400 are coupled together by using a bus 1460. The bus 1460 includes a data bus, and further includes a power bus, a control bus, and a status signal bus. However, for clear description, various types of buses in the figure are marked as the bus 1460.

The processor 1410 may be configured to control the STA, and perform processing that is performed by the STA in the foregoing embodiments. The processor 1410 may perform processing processes related to the STA in the foregoing method embodiments and/or other processes of the technology described in this application, and may further run an operating system, manage the bus, and execute a program or an instruction stored in the memory.

The baseband circuit 1430, the radio frequency circuit 1440, and the antenna 1450 may be configured to support the STA in sending/receiving information to/from the AP in the foregoing embodiments, to support the STA in performing wireless communication with the AP. In an example, training configuration information or transmission configuration information sent by the AP is received through the antenna 1450. Then, the training configuration information or the transmission configuration information is processed by the radio frequency circuit through processing such as filtering, amplification, down-conversion, and digitization, processed by the baseband circuit through baseband processing such as decoding and protocol-based data de-encapsulation, and processed by the processor 1410, to restore service data and signaling information sent by the AP. In still another example, the processor 1410 may generate a beam training frame of the STA, the baseband circuit 1430 performs baseband processing such as protocol-based encapsulation and encoding, and the radio frequency circuit 1440 further performs radio frequency processing such as analog conversion, filtering, amplification, and up-conversion. Then, the beam training frame is transmitted through the antenna 1450. The memory 1420 may be configured to store program code and data of the STA, and the memory 1420 may be the storage module 1330 in FIG. 13. It may be understood that the baseband circuit 1430, the radio frequency circuit 1440, and the antenna 1450 may be further configured to support communication between the STA and another network entity, for example, communication between the STA and a station, such as the AP shown in FIG. 1, associated with the STA.

It may be understood that FIG. 14 shows only a simplified design of the STA. For example, in actual application, the STA may include any quantity of transmitters, receivers, processors, memories, and the like, and all STAs that can implement the present invention fall within the protection scope of the present invention.

In a possible implementation, the beam training apparatus on the STA side may also be implemented by using one or more field-programmable gate arrays (field-programmable gate array, FPGA), programmable logic devices (programmable logic device, PLD), controllers, state machines, gate logic, discrete hardware components, any other suitable circuits, or any combination of circuits that can perform various functions described in this application.

In still another example, an embodiment of this application further provides a computer storage medium. The computer storage medium may store a program instruction used to indicate any one of the foregoing methods, so that a processor executes the program instruction to implement the method and the function related to the STA in the foregoing method embodiments.

The processor in each of the apparatus 1200 and the apparatus 1400 may be a general-purpose processor, such as a general-purpose central processing unit (CPU), a network processor (Network Processor, NP for short), a microprocessor; or may be an application-specific integrated circuit (application-specific integrated circuit, ASIC for short), or one or more integrated circuits configured to control program execution in the solutions of this application. The processor may also be a digital signal processor (Digital Signal Processor. DSP for short), a field-programmable gate array (Field-Programmable Gate Array, FPGA for short) or another programmable logic device, a discrete gate or a transistor logic device, or a discrete hardware component. Alternatively, a controller/processor may be a combination of processors implementing a computing function, for example, a combination of one or more microprocessors, or a combination of the DSP and the microprocessor. The processor usually performs logical and arithmetic operations based on a program instruction stored in the memory.

The memory in each of the apparatus 1200 and the apparatus 1400 may further store an operating system and another application program. Specifically, the program may include program code, and the program code includes a computer operation instruction. More specifically, the memory may be a read-only memory (read-only memory, ROM for short), another type of static storage device that can store static information and an instruction, a random access memory (random access memory, RAM for short), another type of dynamic storage device that can store information and an instruction, or a magnetic disk storage, or the like. The memory may be a combination of the foregoing memories. In addition, the computer-readable storage medium/memory may be located in the processor, or may be located outside the processor, or distributed in a plurality of entities including a processor or a processing circuit. The computer-readable storage medium/memory may be specifically embodied in a computer program product. For example, the computer program product may include a computer-readable medium in a packaging material.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Drive), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   sending, by an access point (AP), training configuration information to a plurality of stations (STAs), wherein the training configuration information comprises a first antenna configuration indicating a plurality of first uplink beams corresponding to the plurality of STAs, wherein the plurality of first uplink beams are antenna weight vectors (AWVs) to be respectively used by the plurality of STAs for uplink transmissions to the AP;
   receiving, by the AP, a plurality of training frames each sent by a corresponding STA in the plurality of STAs by using a corresponding second uplink beam, wherein the corresponding second uplink beam is comprised in the plurality of first uplink beams and is determined by the corresponding STA based on one of the plurality of first uplink beams; and
   determining, by the AP based on the plurality of training frames sent by the plurality of STAs, a plurality of third uplink beams for the plurality of STAs to send uplink data.

2. The method according to claim 1, wherein the method further comprises:
   sending, by the AP, transmission configuration information to the plurality of STAs, wherein the transmission configuration information comprises a second antenna configuration indicating the plurality of third uplink beams for the corresponding plurality of STAs to send uplink data, wherein each of the plurality of third uplink beams is comprised in a corresponding second uplink beam.

3. The method according to claim 1, wherein the first antenna configuration comprises one or more of a transmit antenna ID, a transmit sector ID, a count value, or an AWV ID.

4. The method according to claim 1, wherein the training configuration information further comprises one or more of a downlink beam identifier, a receive antenna ID, a receive sector ID, or an AWV ID for the AP to receive a corresponding training frame.

5. The method according to claim 2, wherein the second antenna configuration comprises one or more of a transmit antenna ID, a transmit sector ID, a count value, or an AWV ID used by a corresponding STA to send uplink data.

6. The method according to claim 2, wherein the transmission configuration information further comprises one or more of a downlink beam identifier, a receive antenna ID, a receive sector ID, or an AWV ID for the AP to receive the uplink data.

7. The method according to claim 2, wherein the transmission configuration information further comprises a plurality of session identifiers, and the plurality of session identifiers identify sessions in which the plurality of training frames are located.

8. A wireless communications method, comprising:
   receiving, by a station (STA), training configuration information sent by an access point (AP), wherein the training configuration information comprises a first antenna configuration indicating a plurality of first uplink beams corresponding to a plurality of STAs, wherein the plurality of first uplink beams are antenna weight vectors (AWVs) to be respectively used by the plurality of STAs for uplink transmissions to the AP;
   determining, by the STA based on the training configuration information, a second uplink beam corresponding to the STA for sending a training frame, wherein the second uplink beam is comprised in the plurality of first uplink beams and is determined by the corresponding STA based on one of the plurality of first uplink beams; and
   sending, by the STA, the training frame by using the second uplink beam, wherein the training frame is used by the AP to determine a third uplink beam used by the STA to send uplink data.

9. The method according to claim 8, wherein the method further comprises:

receiving, by the STA, transmission configuration information sent by the AP, wherein the transmission configuration information comprises a second antenna configuration indicating a plurality of third uplink beams for the corresponding plurality of STAs to send uplink data, wherein each of the plurality of third uplink beams is comprised in a corresponding second uplink beam.

10. The method according to claim 8, wherein the first antenna configuration comprises one or more of a transmit antenna ID, a transmit sector ID, a count value, or an AWV ID.

11. The method according to claim 8, wherein the training configuration information further comprises one or more of a downlink beam identifier, a receive antenna ID, a receive sector ID, or an AWV ID for the AP to receive the training frame.

12. The method according to claim 9, wherein the second antenna configuration comprises one or more of a transmit antenna ID, a transmit sector ID, a count value, or an AWV ID used by a corresponding STA to send uplink data.

13. The method according to claim 9, wherein the transmission configuration information further comprises one or more of a downlink beam identifier, a receive antenna ID, a receive sector ID, or an AWV ID for the AP to receive the uplink data.

14. The method according to claim 9, wherein the transmission configuration information further comprises a plurality of session identifiers, and the plurality of session identifiers identify sessions in which the training frame is located.

15. An apparatus, comprising:
a transceiver;
one or more processors; and
a memory storing computer-executable instructions for execution by the one or more processors to perform operations comprising:
sending, by the apparatus, training configuration information to a plurality of stations (STAs), wherein the training configuration information comprises a first antenna configuration indicating a plurality of first uplink beams corresponding to the plurality of STAs, wherein the plurality of first uplink beams are antenna weight vectors (AWVs) to be respectively used by the plurality of STAs for uplink transmissions to the AP;
receiving, by the apparatus, a plurality of training frames each sent by a corresponding STA in the plurality of STAs by using a corresponding second uplink beam, wherein the corresponding second uplink beam is comprised in the plurality of first uplink beams and is determined by the corresponding STA based on one of the plurality of first uplink beams; and
determining, by the apparatus based on the plurality of training frames sent by the plurality of STAs, a plurality of third uplink beams for the plurality of STAs to send uplink data.

16. The apparatus according to claim 15, wherein the operations further comprising:
sending transmission configuration information to the plurality of STAs, wherein the transmission configuration information comprises a second antenna configuration indicating the plurality of third uplink beams for the corresponding plurality of STAs to send uplink data, wherein each of the plurality of third uplink beams is comprised in a corresponding second uplink beam.

17. The apparatus according to claim 15, wherein the first antenna configuration comprises one or more of a transmit antenna ID, a transmit sector ID, a count value, or an AWV ID.

18. The apparatus according to claim 15, wherein the training configuration information further comprises one or more of a downlink beam identifier, a receive antenna ID, a receive sector ID, or an AWV ID for the apparatus to receive a corresponding training frame.

19. The apparatus according to claim 16, wherein the second antenna configuration comprises one or more of a transmit antenna ID, a transmit sector ID, a count value, or an AWV ID used by a corresponding STA to send uplink data.

20. The apparatus according to claim 16, wherein the transmission configuration information further comprises one or more of a downlink beam identifier, a receive antenna ID, a receive sector ID, or an AWV ID for the apparatus to receive the uplink data.

21. The apparatus according to claim 16, wherein the transmission configuration information further comprises a plurality of session identifiers, and the plurality of session identifiers identify sessions in which the plurality of training frames are located.

22. An apparatus applied to a station (STA), comprising:
a transceiver;
one or more processors; and
a memory storing computer-executable instructions for execution by the one or more processors to perform operations comprising:
receiving, by the STA, training configuration information sent by an access point (AP), wherein the training configuration information comprises a first antenna configuration indicating a plurality of first uplink beams corresponding to a plurality of STAs, wherein the plurality of first uplink beams are antenna weight vectors (AWVs) to be respectively used by the plurality of STAs for uplink transmissions to the AP;
determining, by the STA based on the training configuration information, a second uplink beam corresponding to the STA for sending a training frame, wherein the second uplink beam is comprised in the plurality of first uplink beams and is determined by the corresponding STA based on one of the plurality of first uplink beams; and
sending, by the STA, the training frame by using the second uplink beam, wherein the training frame is used by the AP to determine a third uplink beam used by the STA to send uplink data.

23. The apparatus according to claim 22, wherein the operations further comprising:
receiving transmission configuration information sent by the AP, wherein the transmission configuration information comprises a second antenna configuration indicating a plurality of third uplink beams for the corresponding plurality of STAs to send uplink data, wherein each of the plurality of third uplink beams is comprised in a corresponding second uplink beam.

24. The apparatus according to claim 22, wherein the first antenna configuration comprises one or more of a transmit antenna ID, a transmit sector ID, a count value, or an AWV ID.

25. The apparatus according to claim 22, wherein the training configuration information further comprises one or more of a downlink beam identifier, a receive antenna ID, a receive sector ID, or an AWV ID for the AP to receive the training frame.

26. The apparatus according to claim 23, wherein the second antenna configuration comprises one or more of a transmit antenna ID, a transmit sector ID, a count value, or an AWV ID used by a corresponding STA to send uplink data.

27. The apparatus according to claim 23, wherein the transmission configuration information further comprises one or more of a downlink beam identifier, a receive antenna ID, a receive sector ID, or an AWV ID for the AP to receive the uplink data.

28. The apparatus according to claim 23, wherein the transmission configuration information further comprises a plurality of session identifiers, and the plurality of session identifiers identify sessions in which the training frame is located.

* * * * *